United States Patent
Zhang et al.

(10) Patent No.: US 12,004,217 B2
(45) Date of Patent: Jun. 4, 2024

(54) RANDOM ACCESS PREAMBLE SENDING METHOD, RANDOM ACCESS PREAMBLE RECEIVING METHOD, AND COMMUNICATIONS APPARATUS

(71) Applicant: Huawei Technologies Co., Ltd., Shenzhen (CN)

(72) Inventors: Lili Zhang, Beijing (CN); Chunhua You, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 318 days.

(21) Appl. No.: 17/212,590

(22) Filed: Mar. 25, 2021

(65) Prior Publication Data
US 2021/0212129 A1   Jul. 8, 2021

Related U.S. Application Data
(63) Continuation of application No. PCT/CN2019/107915, filed on Sep. 25, 2019.

(30) Foreign Application Priority Data
Sep. 26, 2018   (CN) .......................... 201811126405.4

(51) Int. Cl.
*H04W 74/00*   (2009.01)
*H04W 52/14*   (2009.01)
*H04W 74/0833*   (2024.01)

(52) U.S. Cl.
CPC ..... *H04W 74/0833* (2013.01); *H04W 52/146* (2013.01); *H04W 74/004* (2013.01)

(58) Field of Classification Search
CPC ..... H04W 52/36; H04W 74/00; H04W 48/12; H04W 74/04; H04W 52/04
See application file for complete search history.

(56) References Cited

U.S. PATENT DOCUMENTS
| | | | |
|---|---|---|---|
| 2010/0331003 A1 | 12/2010 | Park et al. | |
| 2011/0116364 A1 | 5/2011 | Zhang et al. | |

(Continued)

FOREIGN PATENT DOCUMENTS
| | | |
|---|---|---|
| CN | 101646251 A | 2/2010 |
| CN | 104838717 A | 8/2015 |

(Continued)

OTHER PUBLICATIONS
R1-1805017, Ericsson, "On PRACH for NR in Unlicensed Spectrum," 3GPP TSG RAN WG1 Meeting #92bis, Sanya, China, Apr. 16-20, 2018, 3 pages.

(Continued)

*Primary Examiner* — Tu X Nguyen
(74) *Attorney, Agent, or Firm* — Conley Rose, P.C.

(57) ABSTRACT

A random access preamble sending method includes sending, by a terminal device, a first random access preamble to a network device, and sending, by the terminal device during a first time period, a second random access preamble to the network device when the terminal device does not receive a random access response and when a first sending moment arrives, where the first time period is a time window to receive the random access response from the network device, and wherein the first time period comprises the first sending moment.

20 Claims, 8 Drawing Sheets

(56) References Cited

U.S. PATENT DOCUMENTS

| | | | |
|---|---|---|---|
| 2013/0258862 | A1 | 10/2013 | Dinan |
| 2014/0098761 | A1 | 4/2014 | Moon-Il et al. |
| 2015/0016312 | A1* | 1/2015 | Li .................. H04W 74/006 370/280 |
| 2018/0077734 | A1 | 3/2018 | Kim et al. |
| 2018/0146468 | A1 | 5/2018 | Kuo |
| 2020/0077446 | A1* | 3/2020 | Agiwal .............. H04W 16/14 |
| 2020/0229243 | A1 | 7/2020 | Jiang |
| 2020/0367173 | A1* | 11/2020 | Ryu .................. H04W 76/27 |

FOREIGN PATENT DOCUMENTS

| | | |
|---|---|---|
| CN | 107889272 A | 4/2018 |
| CN | 108093490 A | 5/2018 |
| CN | 108370547 A | 8/2018 |

OTHER PUBLICATIONS

R2-1807122, Nokia et al., "Considerations on random access procedure for unlicensed operation," 3GPP TSG-RAN WG2 Meeting #102, Busan, South Korea, May 21-25, 2018, 2 pages.

* cited by examiner

RANDOM ACCESS PREAMBLE SENDING METHOD, RANDOM ACCESS PREAMBLE RECEIVING METHOD, AND COMMUNICATIONS APPARATUS

CROSS REFERENCE TO RELATED APPLICATIONS

This application is a continuation of International Patent Application No. PCT/CN2019/107915 filed on Sep. 25, 2019, which claims priority to Chinese Patent Application No. 201811126405.4 filed on Sep. 26, 2018. The disclosures of the aforementioned applications are hereby incorporated by reference in their entireties.

TECHNICAL FIELD

This application relates to the field of communications technologies, and in particular, to a random access preamble sending method, a random access preamble receiving method, and a communications apparatus.

BACKGROUND

A terminal device can be scheduled to perform uplink transmission only after an uplink transmission time of the terminal device is synchronized with a base station. The terminal device usually establishes a connection to the base station and achieves uplink synchronization by using a random access procedure. In the random access procedure, the terminal device first sends a random access preamble to the base station. After detecting the preamble sent by the terminal device, the base station feeds back a random access response (RAR) to the terminal device. The terminal device can complete uplink synchronization based on the received RAR. After sending the preamble, the terminal device waits, in a time window, to receive the RAR sent by the base station. The time window is referred to as an RAR window. A start moment and an end moment of the RAR window may be configured by the base station. If reception of the RAR fails in the RAR window, the terminal device sends the preamble to the network device again after the RAR window ends, to successfully receive the RAR by retransmitting the preamble.

In other words, after sending the preamble to the base station, the terminal device waits, in the configured RAR window, to receive the RAR. If reception of the RAR fails in the configured RAR window, the terminal device can send, only after the RAR window ends, the preamble again at a time location configured by the network device.

As can be seen, a current manner of sending the preamble is inflexible. Waiting in the RAR window may cause a relatively long delay in preamble retransmission. As a result, a time at which the RAR is successfully received is delayed and random access efficiency is relatively low.

SUMMARY

Embodiments of this application provide a random access preamble sending method, a random access preamble receiving method, and a communications apparatus, to reduce a delay in random access preamble retransmission and improve random access efficiency.

According to a first aspect, a random access preamble sending method is provided. The method may be performed by a terminal device. In the method, the terminal device first sends a first random access preamble to a network device. If receiving no random access response in a first time period, the terminal device sends a second random access preamble to the network device in the first time period. The first time period is a time window used to receive a random access response sent by the network device.

In this solution, a random access preamble sent by the terminal device to the network device out of the first time period is referred to as the first random access preamble, and a random access preamble sent by the terminal device to the network device in the first time period is referred to as the second random access preamble. In other words, a random access preamble sent out of a random access response window and a random access preamble sent in the random access response window are differently represented by the first random access preamble and the second random access preamble respectively. The first random access preamble and the second random access preamble may be a same random access preamble, or may be different random access preambles. In addition, a plurality of first random access preambles sent out of the random access response window may be the same or different, and a plurality of second random access preambles sent in the random access response window may be the same or different.

In addition, the terminal device may send the first random access preamble and the second random access preamble to the network device after listen before talk (LBT) succeeds. To be specific, the terminal device needs to first perform the LBT before sending either the first random access preamble or the second random access preamble to the network device, and can send information only when the LBT succeeds. This is because when the terminal device works in a communications system of an unlicensed band, the terminal device needs to first perform the LBT before sending any information, and can send, only when the LBT succeeds to obtain an available channel through contention, information by using the channel obtained through contention. Similarly, the network device also needs to perform the LBT before sending the random access response, and can send information only when the LBT succeeds.

In this solution, a mechanism in which a random access preamble may also be sent in the RAR window is provided. This shatters an existing rule that only the random access response can be continuously listened for and no random access preamble can be sent in the RAR window. Compared with the current technology, the first random access preamble may be sent at a plurality of time locations (that is, out of the first time period) configured by the network device. In addition, the second random access preamble may be sent in the RAR window configured in correspondence to each time location, thereby increasing occasions of sending the random access preamble and improving flexibility of sending the random access preamble. In addition, because the random access preamble may be sent once or for a plurality of times in the configured RAR window, compared with an existing sending mechanism in which the random access preamble is sent again only after the RAR window ends, a time difference between currently sending the random access preamble and previously sending the random access preamble, or a time difference between currently sending the random access preamble and sending the random access preamble for a next time can be reduced, and a delay of sending the random access preamble again is reduced, thereby increasing a probability that the random access response can be received as soon as possible, and improving random access efficiency.

In a possible design, the terminal device may obtain at least one of time configuration information and power configuration information. The time configuration information is information used to indicate a time for sending the second random access preamble in the first time period. The power configuration information is used to indicate at least one of power ramping performed in the first time period, power ramping performed out of the first time period, or an association relationship between power ramping performed in the first time period and power ramping performed out of the first time period.

In this solution, the terminal device may obtain at least one of the time configuration information and the power configuration information from the network device. To be specific, the network device configures the time configuration information and/or the power configuration information, and sends the configured information to the terminal device. Alternatively, these pieces of configuration information may be preset in the terminal device, or a part of these pieces of configuration information may be preset in the terminal device and the remaining configuration information may be dynamically configured by the network device, or these pieces of configuration information may be obtained in another manner. Regardless of an obtaining manner, before sending the first random access preamble and/or the second random access preamble, the terminal device may determine a time and a transmit power for sending the random access preamble each time, to ensure validity and timeliness of transmitting the random access preamble.

In a possible design, the time configuration information includes at least one piece of information of all sending moments, a sending time period, and a sending moment offset that is capable to send the second random access preamble in the first time period.

In this solution, the time configuration information may be used to indicate a setting of a specific sending moment at which the second random access preamble is sent in the random access response window. In this way, the terminal device sends the second random access preamble relatively accurately in the random access response window, and can transmit the second random access preamble accurately and orderly at a configured moment, thereby avoiding a conflict.

In a possible design, the time configuration information includes any one of the following a total quantity of sending times of sending the second random access preamble in the first time period, a total quantity of sending times of sending the second random access preamble in the first time period and the first sending moment, a total quantity of sending times of sending the second random access preamble in the first time period and the last sending moment, or a total quantity of sending times of sending the second random access preamble in the first time period, the first sending moment, and the last sending moment.

In this solution, the time configuration information may also be used to indicate the total quantity of sending times in the random access response window and some specific sending moments. Indication in more manners can improve flexibility of a sending manner.

In a possible design, the time configuration information may also be used to indicate at least one of the following cases: duration of an interval between a moment at which the second random access preamble is sent for the first time in the first time period and a start moment of the first time period is less than or equal to first predetermined duration, duration of an interval between a moment at which the second random access preamble is sent for the first time in the first time period and a start moment of the first time period is greater than or equal to second predetermined duration, or duration of an interval between a moment at which the second random access preamble is sent for the last time in the first time period and an end moment of the first time period is greater than or equal to third predetermined duration. The duration of the interval in this specification may also be referred to as a time difference, or referred to as a difference, or referred to as an absolute value of a difference.

In this solution, the first predetermined duration is used for limitation so that the second random access preamble may be sent as soon as possible in the first time period, and a retransmission time of the random access preamble is advanced as much as possible, thereby reducing a delay in random access preamble retransmission. The second predetermined duration is used for limitation so that an initial time period in the first time period may be reserved to receive a random access response returned by the network device for a previously sent random access preamble, so that a probability of successfully receiving the random access response can be increased, and resource waste resulting from invalid sending of the random access response caused by excessively early sending of the second random access preamble can be avoided, thereby improving timeliness of receiving the random access response and saving a communication resource. The third predetermined duration is used for limitation so that after the second random access preamble is sent for the last time in the first time period, a specific time period in the first time period may be reserved to receive the random access response that may be returned by the network device, to increase opportunities and a probability of successfully receiving the random access response in the first time period and improve random access efficiency.

In another possible design, the time configuration information may further include a start time period of the first time period, and the start time period is a time length from a moment at which a user equipment (UE) sends the first random access preamble to the start moment of the first time period. Alternatively, in another possible design, the time configuration information may further include corresponding start time periods of different first time periods, and the start time periods are time lengths from a latest moment at which UE sends the first random access preamble to start moments of the first time periods.

In a possible design, the power configuration information includes at least one of a first parameter and a second parameter, the first parameter is used to represent power ramping performed out of the first time period, and the second parameter is used to represent power ramping performed in the first time period.

In this solution, different parameters may be used to represent a power ramping status out of the random access response window and a power ramping status in the random access response window. A reference value of the power ramping performed out of the random access response window is different from that of the power ramping performed in the random access response window. The power ramping is performed by using different reference values, so that flexibility of the power ramping performed in the random access response window and the power ramping performed out of the random access response window can be improved. The first parameter may be one parameter or a plurality of parameters that vary based on a quantity of times of sending the first random access preamble. The second parameter may be one parameter or a plurality of parameters that vary based on a quantity of times of sending the second random access preamble.

In a possible design, the first parameter meets any one of the following conditions: the first parameter is a first predetermined value, the first parameter increases linearly, or a difference between an increase magnitude of the first parameter and an increase magnitude of the second parameter is a second predetermined value.

In a possible design, the second parameter meets any one of the following conditions: the second parameter increases linearly, the second parameter increases exponentially, or a difference between an increase magnitude of the first parameter and an increase magnitude of the second parameter is a second predetermined value.

In this solution, the descriptions of the conditions of the first parameter and the second parameter may limit trends of the power ramping performed out of the random access response window and the power ramping performed in the random access response window to some extent, to determine a power ramping value in the random access response window and a power ramping value out of the random access response window.

In a possible design, the second parameter may represent power ramping that has an increase trend of first being gentle and then being abrupt. In other words, the trend of the power ramping performed in the random access response window may be first gentle and gradually transition to relatively substantial ramping.

This is because reception of the random access response may fail in the random access response window because the network device does not detect the random access preamble sent by the terminal device, or because the network device cannot return the random access response due to temporarily unsuccessful LBT. In an early period of the random access response window, because there is still a period of time before the random access response window ends, if the random access response is not successfully received, it may be considered that this is mainly because the network device cannot return the random access response due to temporarily unsuccessful LBT. Therefore, the random access preamble may be sent in this period of time by using relatively gentle power ramping. In a later period of the random access response window, if the random access response is still not successfully received, it may be considered that this is mainly because the network device does not return the random access response because the network device does not successfully detect the random access preamble. Therefore, to eliminate as much as possible possibility that the network device does not return the random access response because the network device does not detect the random access preamble, a power ramping value that increases steeply (that is, relatively substantially) may be used to perform power ramping in the later period of the random access response window. In this way, the random access preamble may be sent again by using a relatively high transmit power, to increase as much as possible a probability of successfully detecting the random access preamble by the network device, thereby increasing possibility of successfully receiving the random access response, and improving random access efficiency.

In a possible design, the second parameter includes a third parameter and a fourth parameter. When a value of a sixth parameter in the first time period is less than or equal to a first threshold, power ramping may be performed based on the third parameter, or when a value of a sixth parameter in the first time period is greater than a first threshold, power ramping may be performed based on the fourth parameter.

In this solution, the sixth parameter may include transmission duration in the random access response window or a quantity of transmission times of the random access preamble. The first threshold is used to define an early part and a later part in the first time period. For example, the early part is 70% of a window length of the random access response window. In this case, the first threshold may be 70% of the window length of the random access response window. Power ramping of different trends before and after the first threshold is indicated by using two different parameters: the third parameter and the fourth parameter, so that power ramping of different degrees before and after the first threshold can be indicated more clearly, and power ramping accuracy can be improved.

In a possible design, the third parameter and the fourth parameter meet any one of the following conditions: the third parameter is less than the fourth parameter, the third parameter is a constant or increases linearly, the fourth parameter increases linearly, and a linear increase magnitude of the fourth parameter is greater than an increase magnitude of the third parameter, the third parameter increases linearly and the fourth parameter increases exponentially, the third parameter is 0 and the fourth parameter is a third predetermined value, or the third parameter is 0 and the fourth parameter is equal to the first parameter.

In this solution, the different conditions of the third parameter and the fourth parameter are described, so that trends of power ramping performed in the early period and the later period of the random access response window may be relatively clearly described.

In a possible design, the power configuration information includes a fifth parameter, and the fifth parameter is used to indicate power ramping performed out of the first time period and power ramping performed in the first time period. In addition, the power configuration information further includes a mapping relationship of power ramping performed out of the first time period based on the fifth parameter and a mapping relationship of power ramping performed in the first time period based on the fifth parameter. The mapping relationship of the power ramping performed out of the first time period is different from the mapping relationship of the power ramping performed in the first time period. The fifth parameter may be configured by the network device by using signaling, and the mapping relationship of the power ramping performed out of the first time period based on the fifth parameter and the mapping relationship of the power ramping performed in the first time period based on the fifth parameter may be preconfigured in the terminal device. Alternatively, the fifth parameter may be configured by the network device by using signaling, and one of the mapping relationship of the power ramping performed out of the first time period based on the fifth parameter and the mapping relationship of the power ramping performed in the first time period based on the fifth parameter may be configured by the network device by using signaling, and the other mapping relationship may be preconfigured in the terminal device.

In this solution, one reference value, that is, the fifth parameter is used to represent the power ramping performed in the random access response window and the power ramping performed out of the random access response window, and the power ramping performed in the random access response window and the power ramping performed out of the random access response window may be simplified by using a same reference criterion. In addition, because different mapping relationships are used for the power ramping performed out of the random access response window and the power ramping performed in the random access response window, power ramping of different trends may be performed out of the random access response window and in the random access response window, to separately meet a requirement on the power ramping performed out of the random access response window and a requirement on the power ramping performed in the random access response window. Certainly, in a possible design, a same mapping relationship may be alternatively used for the power ramping performed out of the random access response window and the power ramping performed in the random access response window.

In a possible design, a transmit power that is capable to send the second random access preamble for the last time in the first time period is less than or equal to a transmit power that is used to send the first random access preamble at a second moment, and the second moment is a moment at which the first random access preamble is sent for the first time after the first time period.

In this solution, a transmit power (that is, the last transmit power) obtained after entire power ramping is completed in the random access response window may not exceed a transmit power after the random access response window, to fully reflect an effect of the power ramping performed out of the random access response window. In the random access response window, or out of the random access response window, or during transition from in the random access response window to out of the random access response window, overall power ramping is performed by gradually increasing a transmit power. In this way, power consumption of the terminal device can be reduced while a proper transmit power is ensured as much as possible.

According to a second aspect, a random access preamble receiving method is provided. The method may be performed by a network device. The method includes that the network device receives a second random access preamble sent by a terminal device in a first time period, and sends a second random access response to the terminal device in the first time period. The first time period is a time window used to receive a random access response sent by the network device.

In this solution, the first time period may be understood as a random access response window. In other words, the terminal device may send a random access preamble (that is, the second random access preamble) to the network device in the random access response window. Correspondingly, the network device may receive, in the first time period, the second random access preamble sent by the terminal device. Compared with other approaches in which the random access preamble can be received only out of the random access response window, opportunities of receiving the random access preamble in the random access response window are increased. In this way, the network device may send the random access response (that is, the second random access response) to the terminal device in the first time period, and opportunities and a quantity of times of sending the random access response in the random access response window are increased. In this way, a probability of receiving the random access preamble by the terminal device in the random access response window can be increased, and random access efficiency is improved.

In this technical solution, in one case, a first random access response may be a random access response corresponding to the first random access preamble, and the second random access response may be a random access response corresponding to the second random access preamble. In another case, the second random access response is not limited to a response that is definitely made to the second random access preamble, and may be a response that is made to the first random access preamble. For example, a channel is always listened for after the first random access preamble is received, and LBT succeeds only after the second random access preamble is received and therefore the random access response is made.

It should be noted that, the network device receives the second random access preamble sent by the terminal device in the first time period, where "receive" may be understood as "monitor". Monitoring may include two possibilities: detecting and failing to detect. Only when the second random access preamble is detected (that is, successfully monitored), it is considered that the network device receives the second random access preamble. Therefore, in some possible cases, the network device may alternatively fail to detect the second random access preamble sent by the terminal device in the first time period.

Similarly, the network device receives the first random access preamble sent by the terminal device out of the first time period, where "receive" may also be understood as "monitor". Monitoring may include two possibilities: detecting and failing to detect. Only when the first random access preamble is detected (that is, successfully monitored), it is considered that the network device receives the first random access preamble. Therefore, in some possible cases, the network device may alternatively fail to detect the first random access preamble sent by the terminal device out of the first time period.

In this solution, the network device may work in an unlicensed band. Therefore, before information (for example, the foregoing second random access response and the first random access response described below) is sent to the terminal device each time, LBT needs to be performed first, and corresponding information can be sent to the terminal device only after the LBT succeeds. Therefore, a prerequisite for the network device to send the second random access response to the terminal device is that the second random access preamble is successfully detected and the LBT succeeds. In other words, the network device sends the second random access response to the terminal device only after the second random access preamble is successfully detected and the LBT succeeds.

An LBT mode may be used in the LBT. To be specific, one of an LBT mode 1, an LBT mode 2, an LBT mode 3, or an LBT mode 4 is used, or different LBT modes are used for different scenarios. For example, the LBT mode 2 or another mode is used before the random access preamble is sent, and the LBT mode 2 or another mode is used before the random access response is sent.

In a possible design, before receiving the second random access preamble sent by the terminal device in the first time period, the network device may further send the first random access response to the terminal device in the first time period.

In a possible design, before sending the first random access response to the terminal device in the first time period, the network device may further receive the first random access preamble sent by the terminal device out of the first time period (for example, before the first time period). In other words, the terminal device may further send the first random access preamble to the network device out of the random access response window.

In this technical solution, the terminal device may send a corresponding random access preamble to the network device both out of the random access response window and in the random access response window. Further, a random access preamble sent out of the random access response window is referred to as the first random access preamble, and a random access preamble sent in the random access response window is referred to as the second random access preamble. In other words, the network device may consecutively return a random access response to the terminal device twice in the first time period. This is because in practice, even if the network device sends the random access response to the terminal device, the terminal device may not successfully receive the random access response due to a network error, a parsing error, or the like. Therefore, the network device returns the random access response twice, so that opportunities of successfully receiving the random access response by the terminal device in the first time period can be increased, thereby improving random access efficiency.

In a possible design, sending, by the network device, the first random access response to the terminal device in the first time period may include first performing, by the network device, channel detection (that is, LBT), and if channel detection succeeds, sending the first random access response to the terminal device in the first time period.

In a possible design, sending, by the network device, a second random access response to the terminal device in the first time period may include first performing, by the network device, channel detection (that is, LBT), and if channel detection succeeds, sending the second random access response to the terminal device in the first time period.

In other words, the network device first performs the LBT before sending information to the terminal device, and sends information to the terminal device only after the LBT succeeds to obtain an available channel through contention, thereby avoiding resource transmission collision in an unlicensed band.

In a possible design, the network device may send at least one of time configuration information and power configuration information to the terminal device. The time configuration information is information used to indicate a time for sending the second random access preamble in the first time period. The power configuration information is used to indicate at least one of power ramping performed in the first time period, power ramping performed out of the first time period, or an association relationship between power ramping performed in the first time period and power ramping performed out of the first time period.

In a possible design, the time configuration information is used to indicate at least one of the following cases: duration of an interval between a moment at which the second random access preamble is sent for the first time in the first time period and a start moment of the first time period is less than or equal to first predetermined duration, duration of an interval between a moment at which the second random access preamble is sent for the first time in the first time period and a start moment of the first time period is greater than or equal to second predetermined duration, or duration of an interval between a moment at which the second random access preamble is sent for the last time in the first time period and an end moment of the first time period is greater than or equal to third predetermined duration.

In a possible design, the power configuration information includes at least one of a first parameter and a second parameter, the first parameter is used to represent power ramping performed out of the first time period, and the second parameter is used to represent power ramping performed in the first time period.

In a possible design, the second parameter includes a third parameter and a fourth parameter. When a value of a sixth parameter in the first time period is less than or equal to a first threshold, power ramping is performed based on the third parameter, or when a value of a sixth parameter in the first time period is greater than a first threshold, power ramping is performed based on the fourth parameter.

In a possible design, the power configuration information includes a fifth parameter, and the fifth parameter is used to indicate power ramping performed out of the first time period and power ramping performed in the first time period. In addition, the power configuration information further includes a mapping relationship of power ramping performed out of the first time period based on the fifth parameter and a mapping relationship of power ramping performed in the first time period based on the fifth parameter. The mapping relationship of the power ramping performed out of the first time period is different from the mapping relationship of the power ramping performed in the first time period.

In a possible design, a transmit power that is capable to send the second random access preamble for the last time in the first time period is less than or equal to a transmit power that is used to send the first random access preamble at a second moment, and the second moment is a moment at which the first random access preamble is sent for the first time after the first time period.

According to a third aspect, a communications apparatus is provided. The communications apparatus may be a terminal device, or may be an apparatus in a terminal device. The apparatus may include a processing module and a sending module. These modules may perform corresponding functions performed by the terminal device in any one of design examples of the first aspect.

According to a fourth aspect, a communications apparatus is provided. The communications apparatus may be a network device, or may be an apparatus in a network device. The apparatus may include a processing module, a sending module, and a receiving module. These modules may perform corresponding functions performed by the network device in any one of design examples of the second aspect.

According to a fifth aspect, a communications apparatus is provided. The communications apparatus may be a terminal device. The apparatus includes a processor configured to implement the method according to the first aspect. The apparatus may further include a memory configured to store a program instruction and data. The memory is coupled to the processor. The processor may invoke and execute the program instruction stored in the memory, to implement the method according to the first aspect. The apparatus may further include a communications interface. The communications interface is used by the apparatus to communicate with another device. For example, the other device is a network device.

According to a sixth aspect, a communications apparatus is provided. The communications apparatus may be a network device. The apparatus includes a processor configured to implement the method according to the second aspect. The apparatus may further include a memory configured to store a program instruction and data. The memory is coupled to the processor. The processor may invoke and execute the program instruction stored in the memory, to implement the method according to the second aspect. The apparatus may further include a communications interface. The communications interface is used by the apparatus to communicate with another device. For example, the other device is a terminal device.

According to a seventh aspect, a computer-readable storage medium is provided. The storage medium includes a computer instruction, and when the computer instruction is run on a computer, the computer is enabled to perform the method according to the first aspect.

According to an eighth aspect, a computer-readable storage medium is provided. The storage medium includes a computer instruction, and when the computer instruction is run on a computer, the computer is enabled to perform the method according to the second aspect.

According to a ninth aspect, a chip system is provided. The chip system includes a processor and may further include a memory, and is configured to implement the method according to the first aspect. The chip system may include a chip, or may include a chip and another discrete device.

According to a tenth aspect, a chip system is provided. The chip system includes a processor and may further include a memory, and is configured to implement the method according to the second aspect. The chip system may include a chip, or may include a chip and another discrete device.

According to an eleventh aspect, a communications system is provided. The communications system includes the communications apparatus according to the third aspect and the communications apparatus according to the fourth aspect.

According to a twelfth aspect, a communications system is provided. The communications system includes the communications apparatus according to the fifth aspect and the communications apparatus according to the sixth aspect.

According to a thirteenth aspect, a computer program product including an instruction is provided. The computer program product stores the instruction, and when the instruction is run on a computer, the computer is enabled to perform the method according to the first aspect.

According to a fourteenth aspect, a computer program product including an instruction is provided. The computer program product stores the instruction, and when the instruction is run on a computer, the computer is enabled to perform the method according to the second aspect.

In the embodiments of this application, the terminal device may send the random access preamble to the network device in the random access response window, so that a moment at which the random access preamble is sent again is advanced, a delay of sending the random access preamble again is reduced, and random access efficiency is improved.

DESCRIPTION OF EMBODIMENTS

Figure 1:
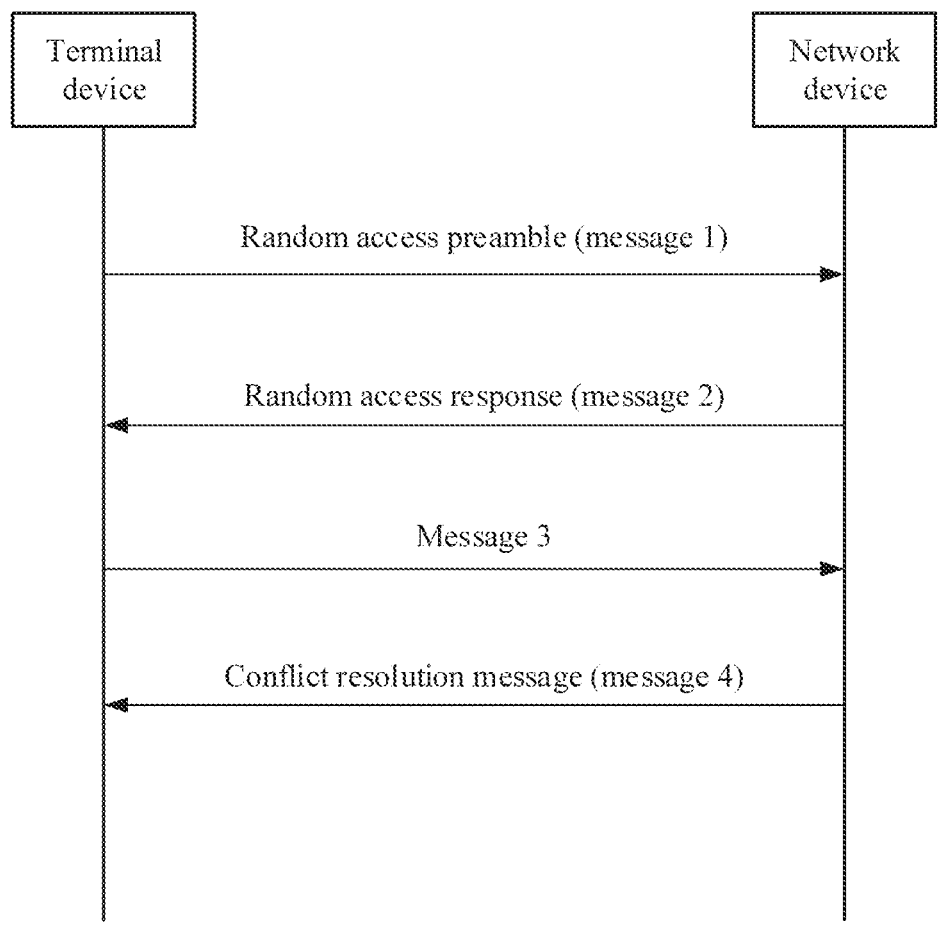
FIG. 1 is a schematic diagram of an existing random access procedure of a terminal device.

To make the purpose, technical solutions, and advantages of the embodiments of the present disclosure clearer, the following clearly describes the technical solutions of some of the embodiments of the present disclosure with reference to the accompanying drawings in the embodiments of the present disclosure.

In the following, some terms of the embodiments of this application are described, so as to help a person skilled in the art have a better understanding.

(1) A terminal device may be a device that provides a user with voice and/or data connectivity, for example, may be a handheld device with a wireless connection function, or a processing device connected to a wireless modem. The terminal device may communicate with a core network by using a radio access network (RAN) and exchange voice and/or data with the RAN. The terminal device may be referred to as user equipment (UE), a wireless terminal device, a mobile terminal device, a subscriber unit, a subscriber station, a mobile station, a mobile console (mobile), a remote station, an access point (AP), a remote terminal, an access terminal, a user terminal device (user terminal), a user agent, a user device, or the like. For example, the terminal device may include a mobile phone (or cellular phone), a computer with a mobile terminal device, a portable, a pocket-sized, a handheld, a computer built-in, or an in-vehicle mobile apparatus, or a smart wearable device (for example, a smartwatch, smart glasses, or a smart helmet). For example, the terminal device may be a device such as a personal communications service (PCS) phone, a cordless telephone set, a Session Initiation Protocol (SIP) phone, a wireless local loop (WLL) station, a personal digital assistant (PDA), or the like. The terminal device further includes a limited device, for example, a device with relatively low power consumption, or a device with a limited storage capability, or a device with a limited computing capability, and includes, for example, an information sensing device such as a barcode, a radio frequency identification (RFID), a sensor, a Global Positioning System (GPS), and a laser scanner.

2. A network device includes, for example, an access network (AN) device and a core network device. An access network device may be a base station (for example, an access point). The base station may refer to a device in communication with a wireless terminal device via one or more cells at an air interface in an access network. The network device may be configured to mutually convert a received over-the-air frame and an Internet Protocol (IP) packet and serve as a router between the terminal device and a rest portion of the access network, where the rest portion of the access network may include an IP network. The network device may coordinate attribute management of the air interface. For example, the network device may include an evolved NodeB (eNodeB, eNB, or e-NodeB) in a Long-Term Evolution (LTE) system or an LTE-advanced (LTE-A) system, or may include a Next-Generation node B (gNB) in a fifth-generation mobile communications technology (5G) New Radio (NR) system. This is not limited in the embodiments of this application. In an LTE system, a core network device is, for example, a mobility management entity (MME). In an NR system, a core network device is, for example, an access and mobility management function (AMF) entity.

3. Licensed spectrum and unlicensed spectrum.

Spectrums used by a wireless communications system may be classified into two types: a licensed spectrum and an unlicensed spectrum. A licensed spectrum may be understood as a physical band that can be used only after a dedicated right of use, authorization, or a license is obtained. Correspondingly, an unlicensed spectrum may be understood as a physical band that is open to a user and can be directly used without obtaining a right of use or authorization. Generally, in a commercial mobile communications system, wireless spectrum resources used for mobile communication are all located in a licensed physical band. A government communication regulatory department allocates a right of use of a dedicated physical band to a mobile communication operator to provide services of mobile communication and bandwidth data access. That is, the mobile operator needs to bid for a licensed spectrum, and can use a corresponding spectrum to carry out an operation activity for mobile communication only after obtaining authorization. Unlicensed spectrums do not need to be auctioned and can be used legally by anyone. For example, a widely used industrial, scientific and medical (ISM) band is an unlicensed physical band that can be used by anyone without authorization. Typical unlicensed bands are, for example, a 2.4 gigahertz (GHz) band or a 5 GHz band, and a WI-FI system may work in the 2.4 GHz band and the 5 GHz band.

4. Listen before talk (LBT) is also referred to as listen before talk, and is a carrier-sense multiple access (CSMA) technology. The LBT mechanism can avoid a conflict when an unlicensed spectrum resource is used.

With a sharp increase of wireless data service volumes, a licensed spectrum may not meet a spectrum requirement of communication. Preemption of an unlicensed spectrum for information transmission may improve a data throughput in a wireless communications network, and can better meet a user requirement. Based on this, the 3rd Generation Partnership Project (3GPP) introduces Licensed Assisted Access (LAA) and enhanced LAA (eLAA) technologies in release 13 and release 14 respectively. To be specific, an LTE/LTE-A system is deployed on an unlicensed spectrum in a non-standalone manner, and usage of an unlicensed spectrum resource is maximized with assistance by a licensed spectrum.

Generally, a communications device (including the foregoing network device and the foregoing terminal device) in a communications system deployed on an unlicensed spectrum uses a radio resource through contention. In other words, before sending a signal, the communications device first listens to determine whether the unlicensed spectrum is idle, for example, determines a busy state or an idle state of a channel by using a value of a receive power on the unlicensed spectrum. If the receive power is less than a threshold, it is considered that a channel on the unlicensed spectrum is in the idle state, and a signal may be sent on the unlicensed spectrum. Otherwise, no signal is sent. This mechanism of listening before sending is referred to as an LBT mechanism. In other words, to enable a plurality of unlicensed-band devices to fairly use an unlicensed-band channel and avoid mutual interference between the unlicensed-band devices, the LBT mechanism is currently used to listen for an idle channel. When detecting through listening that the unlicensed-band channel is occupied, it indicates that the LBT fails and no signal is sent. Only when it is detected through listening that the unlicensed-band channel is idle, it indicates that the LBT succeeds and the communications device sends a signal.

If the LBT succeeds, it indicates that a sending device obtains an available channel through contention. Therefore, after the LBT succeeds, the sending device may send a channel occupation signal to another surrounding device. The channel occupation signal may also be referred to as a request to send (RTS) signal in different embodiments, or a channel reservation signal. The channel occupation signal is used to indicate, to another device, transmission duration, that is, a channel occupancy time that needs to be occupied by the sending device on the channel obtained through contention, to avoid collision caused because the other device transmits data on the channel, thereby improving communication reliability and communication efficiency. The sending device is the communications device that can perform the LBT, for example, may be a network device or may be a terminal device. Further, if the device that initiates the LBT procedure is a network device, the sending device is the network device, or if the device that initiates the LBT procedure is a terminal device, the sending device is the terminal device.

The channel occupancy time may be in a unit of a microsecond (μs), or may be in a unit of an orthogonal frequency-division multiplexing (OFDM) symbol, or may be in a unit of a slot, or may be in a unit of a mini-slot, or the like. A subcarrier spacing corresponding to the OFDM symbol or the slot may be a subcarrier spacing predefined in a standard, or may be the same as a subcarrier spacing of a channel occupation signal.

As can be seen, after the LBT succeeds, the sending device may obtain a right of use of a channel, for example, obtain a right of use of a channel 1, and may also obtain a maximum channel occupancy time (MCOT) for data transmission on the channel 1. In other words, the sending device may perform transmission on the channel 1 in the obtained MCOT without being interfered by another device. In different embodiments, the channel occupancy time obtained by the sending device may be an MCOT, or may be a transmission opportunity (TXOP). The following uses an example in which the MCOT is used as a maximum channel occupancy time for description. It should be noted that a channel occupancy time indicated by a channel occupation signal may be less than or equal to the MCOT. In a to-be-protected channel occupancy time, another receiving device other than the sending device or a receiving device indicated by the sending device cannot perform transmission on a to-be-protected channel, to avoid collision.

Generally, when the sending device is a network device, transmission performed in a corresponding MCOT is downlink transmission. When the sending device is a terminal device, transmission performed in a corresponding MCOT is uplink transmission. Optionally, the sending device may share the obtained right of use of a channel in the MCOT with another device. For example, when the sending device is a network device, the network device may share the right of use of the channel with the terminal device for usage, that is, allow the terminal device to perform transmission in the MCOT. In other words, in some embodiments, there may be switching between uplink transmission and downlink transmission in a MCOT.

A communications device that performs the LBT may be an LTE LAA communications device, a WI-FI communications device, an NR-U communications device, or another communications device working in an unlicensed band. For example, interference to the communications device that performs the LBT may come from a WI-FI system. In an actual scenario, interference to the device that performs the LBT may also come from an LTE LAA communications system, an NR-U communications system, or another communications system working in an unlicensed band. This is not limited in this application.

(5) The terms "system" and "network" may be used interchangeably in the embodiments of this application. "A plurality of" means two or more. In view of this, in the embodiments of this application, "a plurality of" may also be understood as "at least two". "At least one" may be understood as one or more, for example, understood as one, two, or more. For example, including at least one means that one, two, or more items are included, and items included are not limited. For example, if at least one of A, B, or C is included, A, B, C, A and B, A and C, B and C, or A, B, and C may be included. "At least two" may be understood as two or more. Similarly, descriptions such as "at least one type" are also understood similarly. The term "and/or" describes an association relationship for describing associated objects and represents that three relationships may exist. For example, A and/or B may represent the following three cases: only A exists, both A and B exist, or only B exists. In addition, the character "/" generally indicates an "or" relationship between the associated objects unless otherwise specified.

Unless otherwise described, ordinal terms such as "first" and "second" described in the embodiments of this application are intended to distinguish a plurality of objects, and are not intended to limit an order, a time sequence, priorities, or importance degrees of the plurality of objects.

To better understand technical solutions provided in the embodiments of this application, the following first describes the technical background of the embodiments of this application.

FIG. 1 is a schematic diagram of an existing contention-based random access procedure of a terminal device. The procedure includes four steps The terminal device sends a random access preamble (a message 1) to a network device. The network device sends a random access response (a message 2) to the terminal device when detecting the random access preamble sent by the terminal device. The message 2 may include information such as an index number of the detected random access preamble, adjustment information for uplink time synchronization, and an uplink resource allocated to the terminal device to send a message 3. When receiving the message 2, the terminal device obtains the information for uplink time synchronization and the uplink resource, and then sends the message 3 to the network device. The message 3 carries an identifier of the terminal device. When detecting the message 3, the network device sends a contention resolution message (a message 4) to the terminal device. The message 4 also carries an identifier of the terminal device. When receiving the message 4, the terminal device determines, based on whether the identifier of the terminal device carried in the message 4 matches the identifier of the terminal device carried in the message 3, whether the terminal device successfully accesses the network device. If the identifier of the terminal device carried in the message 4 matches the identifier of the terminal device carried in the message 3, the terminal device determines that the terminal device successfully accesses the network device. If the identifier of the terminal device carried in the message 4 does not match the identifier of the terminal device carried in the message 3, the terminal device determines that the terminal device fails to access the network device.

Based on the procedure shown in FIG. 1, the terminal device may have an access failure (that is, a reception failure) in the random access procedure. Reasons of the access failure roughly include the following: (1) The random access preamble sent by the terminal device to the network device does not successfully arrive at the network device. As a result, the network device does not detect the random access preamble and naturally cannot return the random access response. (2) The network device detects the random access preamble sent by the terminal device, but may not have opportunities to send the random access response to the terminal device due to an LBT failure. (3) The network device detects the random access preamble sent by the terminal device, but may not capture an available transmission resource and temporarily does not send the random access response to the terminal device. (4) The terminal device obtains the random access response and sends the message 3 to the network device, but the network device does not detect the message 3, or an error occurs in detection of the message 3, or a quantity of consecutive errors of the message 3 exceeds a maximum quantity of retransmission failures. As a result, the network device does not send the message 4 to the terminal device. (5) The network device successfully detects the message 3 and sends the message 4 to the terminal device, but the terminal device does not detect the message 4. (6) The terminal device detects the message 4, but the identifier of the terminal device carried in the message 4 does not match the identifier of the terminal device carried in the message 3.

Figure 2:
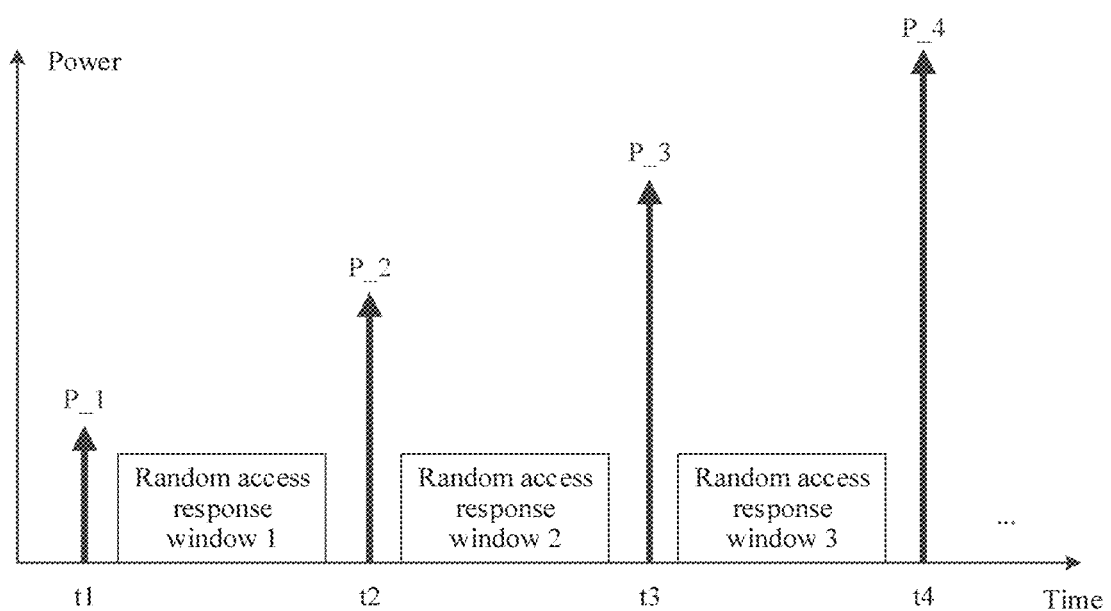
FIG. 2 is a schematic diagram of an existing random access procedure of a terminal device.

After sending the random access preamble to the network device, the terminal device waits, in a configured RAR window, to receive the random access response from the network device. Referring to FIG. 2, t1, t2, t3, and t4 are time locations configured by the network device for the terminal device to send the random access preamble. Therefore, the terminal device can send the random access preamble to the network device only at the four time locations: t1, t2, t3, and t4. The moment t1 is used as an example. After sending the random access preamble to the network device at the moment t1, the terminal device waits, in an RAR window 1 configured for the moment t1, to receive the random access response from the network device. A procedure of sending the random access preamble at the moment t1 and waiting to receive the random access response in the RAR window 1 may be understood based on the procedure shown in FIG. 1. If reception of the random access response fails in the RAR window 1, that is, the random access response is not successfully received in the RAR window 1, the terminal device may send the random access preamble to the network device again at the moment t2, and then wait to receive the random access response from the network device in an RAR window 2, and so on, until the random access response is successfully received. Certainly, it is possible that no random access response is successfully received throughout a random access attempt procedure. For example, a quantity of times of sending the random access preamble exceeds a configured maximum quantity of times.

In addition, the current technology also stipulates a transmit power for sending the random access preamble. To be specific, if no random access response is successfully received after the random access preamble is previously sent, power increase is performed when the random access preamble is sent for a next time, and is also referred to as power ramping or power ramping. Generally, in power ramping, a fixed offset configured by the network device is added to an initial transmit power (that is, a transmit power for sending the random access preamble for the first time).

To be specific, a transmit power for sending the random access preamble for a next time is equal to a current transmit power plus the fixed offset, or a transmit power for currently sending the random access preamble is equal to a previous transmit power plus the fixed offset. FIG. 2 is still used as an example. Assuming that the fixed offset configured on a network side is x and the initial transmit power is P_1, a transmit power is P_2=P_1+x at the moment t2, a transmit power is P_3=P_2+x=P_1+2x at the moment t3, a transmit power is P_4=P_3+x=P_1+3x at the moment t4, and so on.

As can be seen, the terminal device can send the random access preamble only at the time location (for example, t1, t2, t3, and t4 in FIG. 2) configured by the network device. In addition, each time after the random access preamble is sent, the terminal device needs to wait to receive the random access response in the configured RAR window. Currently, especially in an unlicensed spectrum system, LBT needs to be first performed before a signal is sent, and a signal can be sent only after the LBT succeeds. Therefore, in the random access procedure, the network device needs to first perform the LBT before sending the random access response to the terminal device. To enable the network device to succeed in the LBT as much as possible to send the random access response to the terminal device in the corresponding RAR window, the RAR window is usually set to a relatively long time period, that is, duration of the RAR window is as long as possible. This can provide more opportunities for the network device to succeed in the LBT, and increase a probability of successfully sending the random access response. However, after the RAR window is set to be relatively long, it indicates that after sending the random access preamble once, the terminal device needs to spend more time waiting to receive the random access response in the extended RAR window. If the random access response is always not successfully received in the RAR window, the random access preamble can be retransmitted for a next time only after the RAR window ends. Therefore, a manner of sending the random access preamble is inflexible. As a result, a delay of retransmitting the random access preamble for a next time can be increased, thereby causing a relatively long access delay. In other words, opportunities and a quantity of times of retransmitting the random access preamble are reduced, the rareness of each channel obtaining opportunity in a wireless communications system cannot be reflected, and random access efficiency is relatively low.

In view of this, the embodiments of this application provide a solution for sending a random access preamble. Based on an existing solution for sending a random access preamble, a mechanism in which a random access preamble may also be sent in an RAR window is provided. In other words, this shatters an existing rule that only the random access response can be continuously listened for and no random access preamble can be retransmitted in the RAR window. Compared with the current technology, the random access preamble may be sent at a plurality of time locations configured by the network device. In addition, the random access preamble may be retransmitted in the RAR window configured in correspondence to each time location, thereby increasing occasions of sending the random access preamble and improving flexibility of sending the random access preamble. In addition, because the random access preamble is retransmitted in the configured RAR window, compared with an existing sending mechanism in which the random access preamble can be retransmitted only after the RAR window ends, a time difference between previously sending the random access preamble and sending random access preamble for a next time can be reduced, a delay of retransmitting the random access preamble can be reduced, and a probability of receiving the random access response as soon as possible is increased, thereby improving random access efficiency.

The technical solutions provided in the embodiments of this application may be applied to a wireless communications system. The wireless communications system may be an LTE communications system that can work in an unlicensed band, for example, an LTE in unlicensed spectrum (LTE-U) system, or may be a new radio communications system that can work in an unlicensed band, for example, a new NR-U system, or may be another future communications system that works in an unlicensed band. In addition, the wireless communications system may further include a WI-FI system or another communications system that works in an unlicensed band.

The foregoing describes the technical background of the embodiments of this application, and the following further describes application scenarios of the embodiments of this application.

Figure 3A:
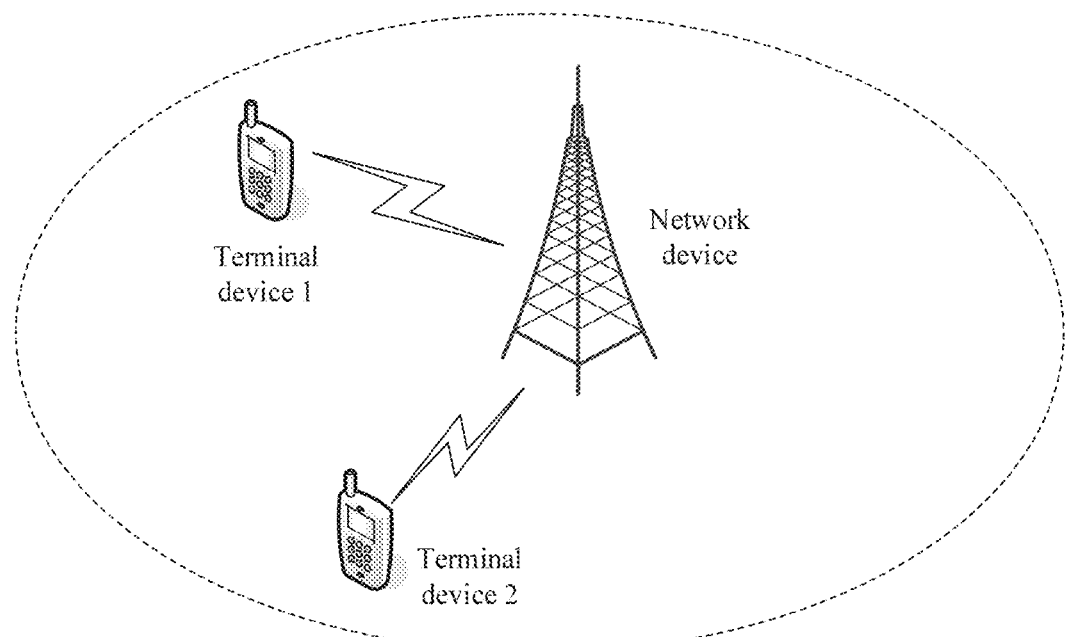
FIG. 3A is a schematic diagram of an application scenario according to an embodiment of this application.

Referring to a schematic diagram of an application scenario according to an embodiment of this application shown in FIG. 3A, FIG. 3A includes a network device and two terminal devices, and the network device is connected to the two terminal devices. Certainly, the quantities of network devices and terminal devices in FIG. 3A are only an example. In an actual application, the network device may provide a service for one or more terminal devices, and some or all of the plurality of terminal devices may send a random access preamble to the network device by using the method provided in the embodiments of this application. In FIG. 3A, the network device may broadcast or configure information for random access for each terminal device. The information for random access is also referred to as random access configuration information and may be sent by using system information (SI). In a future wireless communications network, the random access configuration information may also be sent in another manner. For example, sending of the random access configuration information is triggered based on a user requirement. For another example, the random access configuration information may be sent by using a data channel scheduled by using a control channel, where the control channel may be located in specific search space or common search space. When receiving the random access configuration information, the terminal device may select a random access preamble based on the random access configuration information, and send the selected random access preamble to the network device at a transmission location indicated by the random access configuration information. When detecting the random access preamble sent by the terminal device, the network device may send a random access response to the terminal device. The transmission location indicated by the random access configuration information includes at least one of a time location, a frequency domain location, and a spatial location. The time location may be at least one or a combination of a symbol, a mini symbol, a slot, a mini-slot, a subframe, or a mini-subframe. The spectral location may be at least one of an interlace based on a physical resource block (PRB), an interlace based on a resource element (RE), or an interlace based on a sub-PRB (i.e., a resource unit less than a PRB). The spatial location may be a beam or an antenna port. In addition, a communications device that works in an unlicensed band, regardless of the terminal device or the network device, needs to perform LBT to listen for an idle channel before sending a signal, thereby avoiding a sending collision.

Figure 3B:
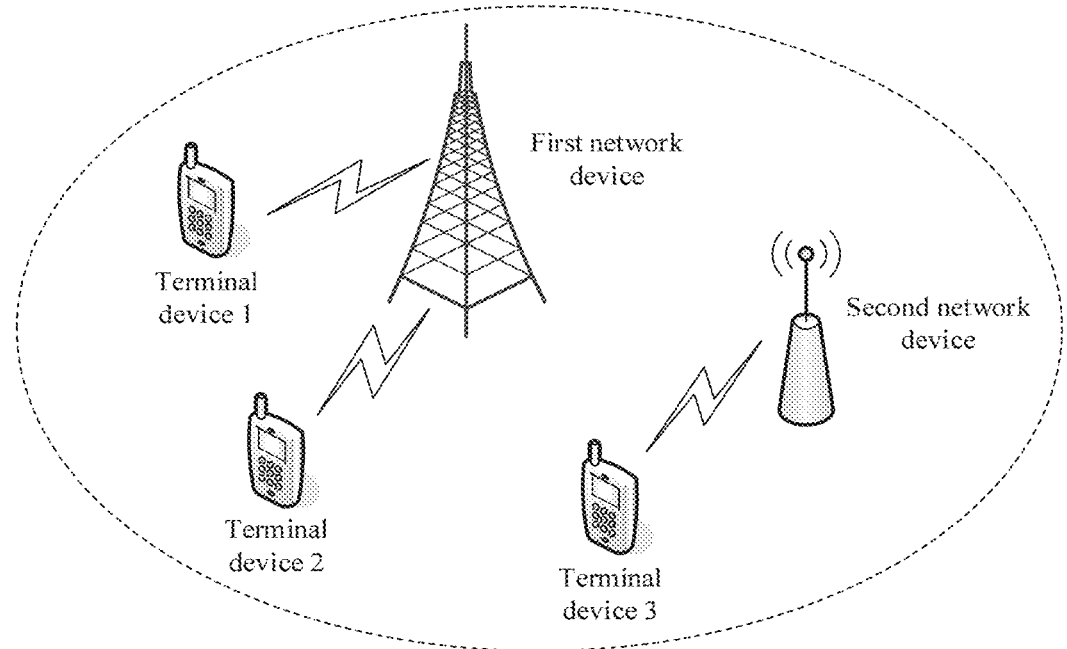
FIG. 3B is a schematic diagram of another application scenario according to an embodiment of this application.

Referring to a schematic diagram of another application scenario according to an embodiment of this application shown in FIG. 3B, FIG. 3A includes a first network device, a second network device, and three terminal devices. The first network device is connected to two terminal devices, and the second network device is connected to the remaining terminal device. The first network device is, for example, an eNB or a gNB, and the second network device is, for example, a wireless access point (AP) in a WI-FI network or an eNB or a gNB. Similar to the terminal devices shown in FIG. 3A, some or all of the terminal devices in FIG. 3B may send a random access preamble to a corresponding network device to perform random access.

The following describes, with reference to the accompanying drawings, the technical solutions provided in the embodiments of this application.

As described above, the embodiments of this application provide the new mechanism in which a random access preamble not only can be sent out of a random access response window, but also can be sent in a random access response window. Based on the new mechanism, an embodiment of this application provides a random access preamble sending method. Before the method is described, some additional configurations in the embodiments of this application are first described with reference to FIG. 4.

Figure 4:
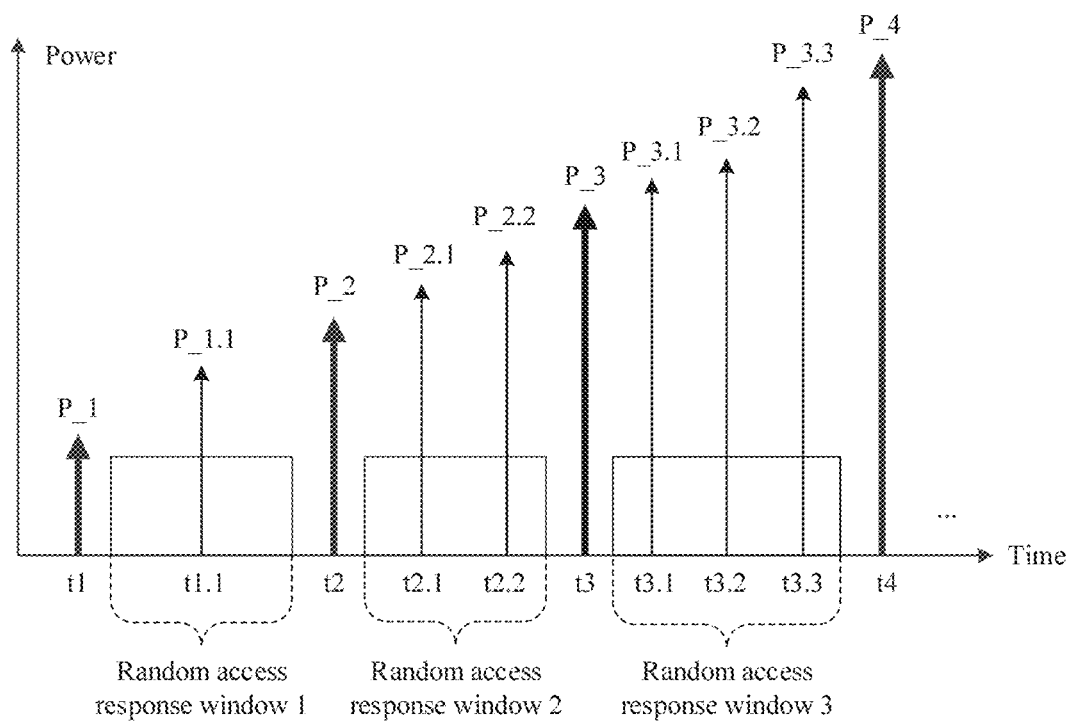
FIG. 4 is a schematic diagram of sending a random access preamble according to an embodiment of this application.

Referring to FIG. 4, t1, t2, t3, and t4 in FIG. 4 are time locations that are configured by the network device for the terminal device and that is capable to send a random access preamble. t1, t2, t3, and t4 may be configured in an existing manner, for example, may be configured and understood in the manner of t1, t2, t3, and t4 in FIG. 2. Random access response windows correspondingly configured for t1, t2, and t3 are sequentially three time periods: an RAR window 1, an RAR window 2, and an RAR window 3. A start moment and an end moment of each random access response window may be configured by the network device. As can be seen, t1, t2, t3, and t4 are all time locations out of the random access response windows and are out of all the random access response windows. In addition, each time location of t1, t2, t3, and t4 corresponds to one random access response window. It should be noted that a random access response window correspondingly configured for t4 is not shown in FIG. 4. In addition, each of the time locations t1, t2, t3, and t4 may be a moment, or may be a time period. For brevity and convenience, sending a random access preamble at a time location, for example, t1, is described as sending a random access preamble at the moment t1 below.

For ease of description, in the embodiments of this application, moments such as t1, t2, t3, and t4 that are out of the random access response windows and at which a random access preamble is sent are referred to as out-of-window sending moments.

In the current technology, after the terminal device sends the random access preamble to the network device at the moment t1, the terminal device waits, in the RAR window 1, to receive the random access response sent by the network device. If the terminal device does not successfully receive the random access response in the RAR window 1, the terminal device may send the random access preamble to the network device again at a next out-of-window sending moment (that is, the moment t2), and then wait, in the RAR window 2, to receive the random access response sent by the network device. If the terminal device does not successfully receive the random access response in the RAR window 2, the terminal device may send the random access preamble to the network device again at a next out-of-window sending moment (that is, the moment t3), and so on. The terminal device no longer repeatedly sends the random access preamble to the network device when the random access preamble is successfully received or an allowable maximum quantity of sending times is reached.

In the embodiments of this application, in addition to time locations (out-of-window sending moments) such as t1, t2, t3, and t4 that are already configured in the current technology and that is capable to send a random access preamble, a moment that is capable to send a random access preamble may be further configured in the random access response window. Therefore, the random access preamble may be further sent at a moment configured in the random access response window. For ease of description, in the embodiments of this application, a moment configured in the random response receiving window to send the random access preamble is referred to as an in-window sending moment.

In an in-window sending moment, repeated sending may be performed, that is, a random access preamble used at a previous out-of-window sending moment is selected and sent, or new sending may be performed, that is, a random access preamble is reselected based on the random access configuration information and sent.

Because one random access attempt process may include one or more random access response windows, in the embodiments of this application, in-window sending moments may be configured in all random access response windows, or in-window sending moments may be configured only in some random access response windows. Quantities of in-window sending moments configured in all random access response windows may be equal, or in-window sending moments or quantities of sending times configured in all random access response windows may be not completely equal, that is, some of in-window sending moments or quantities of sending times may be equal and the remaining may not be equal. In other words, in the embodiments of this application, random access response windows in which in-window sending moments are configured and a quantity of in-window sending moments configured in each random access response window are not limited. For example, as shown in FIG. 4, in-window sending moments are configured in all three random access response windows: the RAR window 1, the RAR window 2, and the RAR window 3, and quantities of in-window sending moments configured in the random access response windows are not equal. Referring to FIG. 4, in the RAR window 1, only one in-window sending moment, that is, t1.1, is configured. In the RAR window 2, two in-window sending moments, that is, t2.1 and t2.2, are configured. In the RAR window 3, three in-window sending moments, that is, t3.1, t3.2, and t3.3, are configured.

In addition, in the embodiments of this application, window lengths of all random access response windows may be equal or may not be equal. For example, as shown in FIG. 4, window lengths of RAR window 1 and RAR window 2 are equal, and window lengths of the RAR window 3 and the RAR window 1 (or the RAR window 2) are not equal. A window length of each random access response window may be configured by the network device. For example, a window length of a subsequent random access response window may be gradually increased based on a quantity of times of sending a random access preamble out of a random access response window. Alternatively, for another example, a window length of a front random access response window may be set to be greater than a window length of a rear random access response window. Alternatively, for another example, a window length of a front random access response window may be set to be less than or equal to a window length of a rear random access response window. Alternatively, a window length of each random access response window may be set in another manner. This is not limited in the embodiments of this application.

It should be noted that "in a random access response window" in this specification refers to in a time period corresponding to the random access response window, and "out of a random access response window" in this specification refers to out of a time period corresponding to the random access response window, for example, before or after the time period corresponding to the random access response window.

As described above, based on the mechanism in which a random access preamble can be sent both out of a random response window and in a random access response window provided in the embodiments of this application, in the embodiments of this application, random access preambles sent out of the random access response window are collectively referred to as a first random access preamble, and random access preambles sent in the random access response window are collectively referred to as a second random access preamble. It should be understood that "first" and "second" in the first random access preamble and the second random access preamble in this specification are merely intended to differently represent random access preambles sent in and out of the random access response window, and constitute no limitation on whether the two random access preambles are the same. FIG. 4 is still used as an example. For example, a first random access preamble sent at the moment t1 and a second random access preamble sent at the moment t1.1 are a same random access preamble, or a first random access preamble sent at the moment t1 and a second random access preamble sent at the moment t3.2 are different random access preambles, or a first random access preamble sent at the moment t2 and a second random access preamble sent at the moment t2.2 are a same random access preamble. In addition, different first random access preambles (or second random access preambles) may be the same or may be different. For example, a first random access preamble sent at the moment t1 and a first random access preamble sent at the moment t2 are a same random access preamble. For another example, a second random access preamble sent at the moment t1.1 and a second random access preamble sent at the moment t2.2 are different random access preambles.

As shown in FIG. 4, for both the out-of-window sending moment and the in-window sending moment, a corresponding transmit power is configured for each sending moment, that is, a random access preamble may be sent at each moment by using the configured transmit power. For example, transmit powers correspondingly configured for the out-of-window sending moments t1, t2, t3, and t4 are represented by $P\_1$, $P\_2$, $P\_3$, and $P\_4$, and transmit powers correspondingly configured for in-window sending moments such as t1.1, t2.1, and t2.2 are represented by $P\_1.1$, $P\_2.1$, and $P\_2.2$. It may be understood that assuming that there are a total of N out-of-window sending moments out of the random access response window and N is a positive integer, a transmit power correspondingly configured for an $n^{th}$ out-of-window sending moment may be represented by $P\_n$, where n is a positive integer less than or equal to N. Similarly, a transmit power configured for a sending moment in the random access response window may also be represented in a similar manner.

Figure 5:
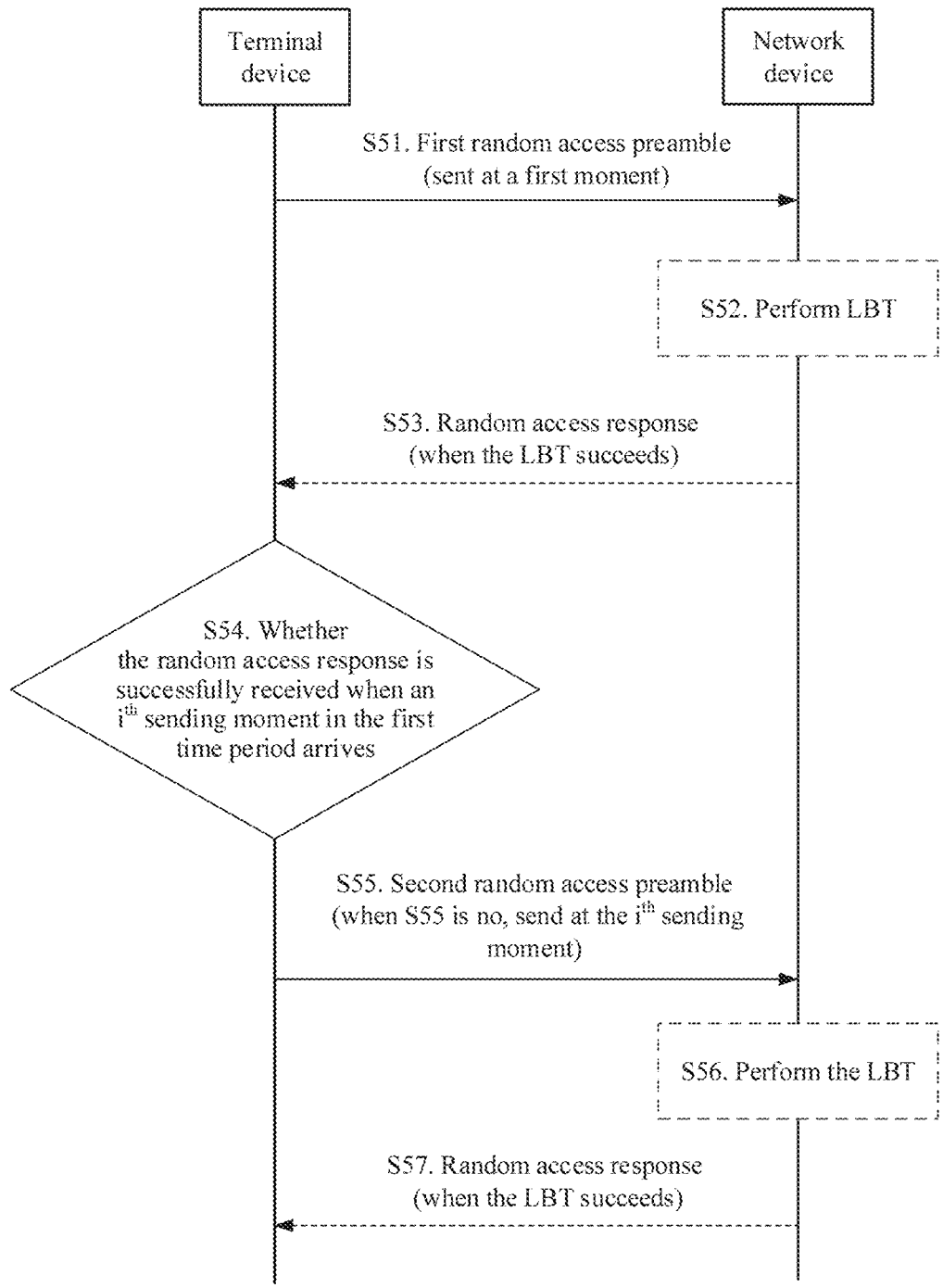
FIG. 5 is a flowchart of a random access preamble sending method according to an embodiment of this application.

Some additional configurations in the embodiments of this application are described with reference to FIG. 4. The following further describes a random access preamble sending method in an embodiment of this application. Referring to FIG. 5, a procedure of the method is described as follows:

S51. A terminal device sends a first random access preamble to a network device at a first moment.

The first moment is any moment of the foregoing out-of-window sending moments, for example, any moment of t1, t2, t3, and t4 shown in FIG. 4. In other words, the first moment in this embodiment of this application is a moment configured by the network device for the terminal device to send a random access preamble out of the random access response window. Because the first moment is an out-of-window sending moment out of the random access response window, the random access preamble sent at the first moment is referred to as the first random access preamble. Because all random access response windows are configured based on out-of-window sending moments configured out of the windows, the first moment may be a moment at which a random access preamble is sent for the first time in a random access attempt, for example, the moment t1 in FIG. 4, that is, the first moment is a moment at which a random access preamble is sent for the first time in a current random access attempt process. For another example, the first moment may also be a moment at which the random access preamble is sent again out of the random access response window other than the moment at which the random access preamble is sent for the first time, for example, any moment of t2, t3, and t4 in FIG. 4.

In this embodiment of this application, the terminal device may work in an unlicensed band. Therefore, before sending a signal (including the first random access preamble and the second random access preamble herein) to the network device, the terminal device needs to first perform LBT, and can send a signal to the network device only after the LBT succeeds.

After the terminal device sends the first random access preamble to the network device, the network device may have received the first random access preamble, or may not have received the first random access preamble. If the network device detects the first random access preamble, the network device sends a random access response to the first random access preamble to user equipment. The random access response includes an index number of the first random access preamble, adjustment information for user uplink time synchronization, an uplink resource allocated to the user equipment, and the like. If the network device does not detect the first random access preamble, it may be considered that the first random access preamble does not successfully arrive at the network device, or the network device does not detect, due to a reason of the network device, the first random access preamble that actually arrives. Therefore, the network device does not return the random access response to the terminal device. In this case, it indicates that an access attempt by the terminal device by using the first random access preamble fails. Therefore, for the terminal device, it indicates that reception of the random access response fails.

S52. The network device performs the LBT.

As described above, if the network device has received the first random access preamble sent by the terminal device, the network device determines to send the random access response to the terminal device. If the network device works in an unlicensed band, after sending the random access response to the terminal device, the network device also needs to first start an LBT mechanism to listen for an idle channel. Only after the LBT succeeds, the network device can send the random access response to the terminal device by using an idle channel.

S53. After the LBT succeeds, the network device sends the random access response to the terminal device.

In a specific implementation process, if the network device has not received the first random access preamble sent by the terminal device at the first moment, the network device naturally does not send the random access response to the terminal device. Therefore, in this case, the network device naturally does not need to perform the LBT, and does not return the random access response. For another example, even if the network device has received the first random access preamble sent by the terminal device at the first moment, if the network device does not work in an unlicensed band, the network device may directly send the random access response to the terminal device without performing the LBT. For another example, even if the network device has received the first random access preamble sent by the terminal device at the first moment, the network device may not send the random access response to the terminal device because the LBT fails all the time.

As can be seen from the foregoing analysis, in a specific implementation process, the network device may not perform the LBT, that is, may not perform step S52 and instead directly send the random access response to the terminal device, or may always not send the random access response to the terminal device due to an LBT failure, or the like. In other words, S52 and S53 may not be mandatory steps, that is, are optional steps, because S52 and S53 may not be performed in practice. Therefore, in FIG. 5, both S52 and S53 are represented by dashed lines, and it indicates that S52 and S53 may not be mandatory steps.

S54. The terminal device determines whether the random access response is successfully received when an $i^{th}$ sending moment in a first time period arrives.

S55. If the random access response is not successfully received when the $i^{th}$ sending moment arrives, the terminal device sends a second random access preamble to the network device at the $i^{th}$ sending moment.

The first time period may be a random access response window configured for the out-of-window sending moment, that is, the first moment in the current technology. Therefore, the first moment is a moment before a start moment of the first time period. As shown in the example in FIG. 4, the first time period may be any random access response window of the RAR window 1, the RAR window 2, and the RAR window 3. There is an association relationship between the first moment and the first time period. Further, the first moment may be a closest out-of-window sending moment before the first time period. To be specific, the first moment may be a closest time location that is before the first time period and that is configured by the network device for the terminal device to send the random access preamble.

As described in FIG. 4, the first time period may include one or more moments at which the random access preamble may be sent. To be specific, at least one in-window sending moment may be configured in the first time period. It is assumed that K in-window sending moments are configured in the first time period, where K is an integer greater than or equal to 1. The random access preamble may be sent at each of the K in-window sending moments. In other words, the terminal device may repeatedly send the random access preamble for a maximum of K times in the first time period. In other words, the terminal device has a capability of sending the random access preamble for K times in the first time period. However, in practice, for example, the first time period is the RAR window 3 shown in FIG. 4. As can be seen, a value of K is 3 in this case. In other words, the terminal device can send the random access preamble for a maximum of three times in the RAR window 3. It should be noted that although the terminal device has a capability of sending the random access preamble for three times in the RAR window 3, in a specific implementation process, the terminal device may successfully receive, before the first time (that is, the moment t3.1) arrives, the random access response sent by the network device. Because the random access response is successfully received, random access may be completed based on the successfully received random access response. Therefore, the random access preamble naturally does not need to be repeatedly sent to the network device. If the random access response is received before the moment t3.1 arrives, the random access response should be a random access response sent based on a previously sent random access preamble, that is, a random access response returned based on the first random access preamble sent by the terminal device at the moment t3.

Alternatively, if the random access response is not successfully received when the moment t3.1 arrives, the random access preamble may be repeatedly sent to the network device at the moment t3.1. After the random access preamble is repeatedly sent at the moment t3.1, the terminal device may continue to detect whether the random access response sent by the network device is successfully received. If the random access response is successfully received before the moment t3.2 arrives, random access may be performed based on the successfully received random access response. Therefore, the random access preamble is not repeatedly sent subsequently. If the random access response is still not successfully received when the moment t3.2 arrives, it indicates that reception of the random access response fails. Similarly, the random access preamble may continue to be sent to the network device at the moment t3.2, and so on. After sending the second random access preamble at a moment at which the random access preamble may be sent for the last time in the first time period, the terminal device may detect again whether the random access response is successfully received. If the random access response is successfully received before the moment t4 arrives, repeated sending of the random access preamble may be ended. Otherwise, the first random access preamble may be repeatedly sent to the network device at the moment t4, and so on.

In other words, although an in-window sending moment that is capable to send the random access preamble is configured in the first time period, if the random access response is not successfully received when an in-window sending moment arrives, the random access preamble is repeatedly sent at the in-window sending moment. If the random access response is successfully received before the repeated sending moment arrives, the random access preamble does not need to be repeatedly sent, and random access is performed by using the successfully received random access response.

In general, the terminal device may send the second random access preamble to the network device in the first time period only when not successfully receiving the random access response in the first time period. Still for example, K in-window sending moments are configured in the first time period. If not successfully receiving the random access response when an $i^{th}$ in-window sending moment in the first time period arrives, the terminal device may send the second random access preamble to the network device at the $i^{th}$ in-window sending moment, where i may be any value of K, that is, i is a positive integer less than or less than K. Still for example, the first time period is the RAR window 3 in FIG. 4. In this case, the value of K is 3. Therefore, a value of i may be 1, 2, or 3. To be specific, the terminal device may detect, when each in-window sending moment arrives, whether the random access response is successfully received, and determine, based on a determining result, whether to send the second random access preamble again at a current in-window sending moment.

In addition, as can be seen from the foregoing description of the procedure for sending the random access preamble by the terminal device in FIG. 1, the terminal device may not successfully receive the random access response because of the foregoing six reasons. As long as any one of the foregoing possible reasons occurs, the terminal device may fail to receive the random access response. For a specific reason, refer to the foregoing description of FIG. 1. Descriptions are not repeated herein again.

A process of sending the second random access preamble once or for a plurality of times in the first time period may be completed by using the foregoing steps S54 and S55. In other words, opportunities and a quantity of times of sending the random access preamble in the random access response window are increased, so that the random access preamble can be sent for a next time without waiting until the random access response window ends. In this way, the random access preamble can be sent again as early as possible, thereby reducing a delay of sending the random preamble for a next time and improving random access efficiency to some extent.

S56. The network device performs the LBT.

Similar to step S52, after the terminal device sends the second random access preamble to the network device once or for a plurality of times in the first time period, if the network device detects the second random access preamble sent by the terminal device, the network device may return a random access response to the terminal device. Before sending the random access response, the network device needs to first perform the LBT if working in an unlicensed band.

S57. After the LBT succeeds, the network device sends the random access response to the terminal device.

For specific implementations of S56 and S57, refer to the foregoing specific implementation processes of S52 and S53. Descriptions are not repeated herein again.

In the manner of sending the second random access preamble in the first time period in this embodiment of this application, compared with the current technology, a time of repeatedly sending the random access preamble may be advanced as much as possible. In this way, a delay of retransmitting the random access preamble for a next time can be reduced, thereby increasing opportunities and a probability of successfully receiving the random access response in the first time period, and improving random access efficiency and random access effectiveness.

In this embodiment of this application, the network device may receive the second random access preamble sent by the terminal device in the first time period, and then send a second random access response to the terminal device in the first time period, where the first time period is a time window used to receive a random access response sent by the network device.

In other words, the terminal device may send a random access preamble (that is, the second random access preamble) to the network device in the random access response window. Correspondingly, the network device may receive, in the first time period, the second random access preamble sent by the terminal device. Compared with other approaches in which the random access preamble can be received only out of the random access response window, opportunities of receiving the random access preamble in the random access response window are increased. In this way, the network device may send the random access response (that is, the second random access response) to the terminal device in the first time period, and opportunities and a quantity of times of sending the random access response in the random access response window are increased. In this way, a probability of receiving the random access preamble by the terminal device in the random access response window can be increased, and random access efficiency is improved.

In this embodiment of this application, in one case, a first random access response may be a random access response corresponding to the first random access preamble, and the second random access response may be a random access response corresponding to the second random access preamble. In another case, the second random access response is not limited to a response that is definitely made to the second random access preamble, and may be a response that is made to the first random access preamble. For example, a channel is always listened for after the first random access preamble is received, and LBT succeeds only after the second random access preamble is received and therefore the random access response is made.

It should be noted that, the network device receives the second random access preamble sent by the terminal device in the first time period, where "receive" may be understood as "monitor". Monitoring may include two possibilities: detecting and failing to detect. Only when the second random access preamble is detected (that is, successfully monitored), it is considered that the network device receives the second random access preamble. Therefore, in some possible cases, the network device may alternatively fail to detect the second random access preamble sent by the terminal device in the first time period.

Similarly, the network device receives the first random access preamble sent by the terminal device out of the first time period, where "receive" may also be understood as "monitor". Monitoring may include two possibilities: detecting and failing to detect. Only when the first random access preamble is detected (that is, successfully monitored), it is considered that the network device receives the first random access preamble. Therefore, in some possible cases, the network device may alternatively fail to detect the first random access preamble sent by the terminal device out of the first time period.

In a specific implementation process, the network device may work in an unlicensed band. Therefore, before information (for example, the foregoing second random access response and the first random access response described below) is sent to the terminal device each time, LBT needs to be performed first, and corresponding information can be sent to the terminal device only after the LBT succeeds. Therefore, a prerequisite for the network device to send the second random access response to the terminal device is that the second random access preamble is successfully detected and the LBT succeeds. In other words, the network device sends the second random access response to the terminal device only after the second random access preamble is successfully detected and the LBT succeeds.

In addition, an LBT mode may be used in the LBT in this specification. To be specific, one of an LBT mode 1, an LBT mode 2, an LBT mode 3, or an LBT mode 4 is used, or different LBT modes are used for different scenarios. For example, the LBT mode 2 or another mode is used before the random access preamble is sent, and the LBT mode 2 or another mode is used before the random access response is sent.

In a possible implementation, before receiving the second random access preamble sent by the terminal device in the first time period, the network device may further send the first random access response to the terminal device in the first time period.

In a possible implementation, before sending the first random access response to the terminal device in the first time period, the network device may further receive the first random access preamble sent by the terminal device out of the first time period (for example, before the first time period). In other words, the terminal device may further send the first random access preamble to the network device out of the random access response window.

In this embodiment of this application, the terminal device may send a corresponding random access preamble to the network device both out of the random access response window and in the random access response window. Further, a random access preamble sent out of the random access response window is referred to as the first random access preamble, and a random access preamble sent in the random access response window is referred to as the second random access preamble. In other words, the network device may consecutively return a random access response to the terminal device twice in the first time period. This is because in practice, even if the network device sends the random access response to the terminal device, the terminal device may not successfully receive the random access response due to a network error, a parsing error, or the like. Therefore, the network device returns the random access response twice, so that opportunities of successfully receiving the random access response by the terminal device in the first time period can be increased, thereby improving random access efficiency.

The first random access response may be a random access response corresponding to the first random access preamble, and the second random access response may be a random access response corresponding to the second random access preamble.

In a possible implementation, the sending, by the network device, the first random access response to the terminal device in the first time period may include first performing, by the network device, channel detection (that is, LBT), and if channel detection succeeds, sending the first random access response to the terminal device in the first time period.

In another possible implementation, the sending, by the network device, a second random access response to the terminal device in the first time period may include first performing, by the network device, channel detection (that is, LBT), and if channel detection succeeds, sending the second random access response to the terminal device in the first time period.

In other words, the network device first performs LBT before sending information to the terminal device, and sends information to the terminal device only after the LBT succeeds to obtain an available channel through contention, thereby avoiding resource transmission collision in an unlicensed band.

In a specific implementation process, the terminal device may send the second random access preamble to the network device once or for a plurality of times in the first time period. FIG. 4 is still used as an example. In a random access response window, for example, the RAR window 2, the terminal device may send the second random access preamble to the network device for the first time at the moment t2.1. After receiving the second random access preamble, the network device may send the random access response to the terminal device once in the random access response window. However, the terminal device does not successfully receive the random access response because of some reasons, for example, LBT of a network fails, there is network jitter, or the terminal device has a parsing error. Therefore, the terminal device may send the second random access preamble to the network device again at the moment t2.2. Further, the network device may generate another random access response based on the second random access preamble received again, and return the other random access response to the terminal device in the RAR window 2.

In other words, if the network device receives, in the first time period for a plurality of times, the second random access preamble sent by the terminal device, it indicates that the terminal device sends the second random access preamble for a plurality of times in the first time period. Each time after the second random access preamble sent by the terminal device is received, the network device may return the random access response to the terminal device after the LBT succeeds. In practice, the network device may fail in the LBT, or even if the network device succeeds in the LBT and sends the random access response to the terminal device, the terminal device may not successfully receive the random access response because of some reasons. Therefore, the network device returns the random access response for a plurality of times, so that opportunities of successfully receiving the random access response by the terminal device can be increased, to ensure as much as possible that the terminal device can successfully receive the random access response in the random access response window. In addition, because the terminal device sends the second random access preamble to the network device in the first time period, compared with the current technology, a time difference between currently sending a random access preamble and previously sending a random access preamble, or a time difference between currently sending a random access preamble and sending a random access preamble for a next time can be reduced, and a delay of sending the random access preamble again is reduced, thereby increasing a probability of successfully receiving the random access response as soon as possible, and improving random access efficiency.

The foregoing describes the procedure of sending the second random access preamble in the random access response window as a whole. In a specific sending process, a specific configuration of an in-window sending moment, that is, a moment at which the second random access preamble may be sent, in the random access response window needs to be further determined, and a transmit power for sending the second random preamble each time needs to be further determined. In view of this, this embodiment of this application further provides time configuration information corresponding to a time and power configuration information corresponding to a transmit power. The time configuration information is information used to indicate a time at which the second random access preamble is sent in the random access response window. Because the first time period is also one of the random access response windows, time information in the first time period may be naturally determined by using the time configuration information.

The power configuration information indicates a transmit power that should be used to send a random access preamble each time in an entire random access procedure. The power configuration information may be used to indicate at least one of power ramping performed in a random access response window, power ramping performed out of a random access response window, and an association relationship between power ramping performed in a random access response window and power ramping performed out of a random access response window.

In other words, before sending the random access preamble (including the first random access preamble and/or the second random access preamble), the terminal device may first obtain the time configuration information and/or the power configuration information, and then complete a corresponding action based on the obtained configuration information. In a possible implementation, the configuration information may be pre-stored locally by the terminal device, and the terminal device may obtain the configuration information in a manner of obtaining the configuration information locally. In another possible implementation, the configuration information may be dynamically configured by the network device. In other words, the network device may notify the terminal device of the configuration information by using signaling or a signal. In still another possible implementation, the terminal device may already have, in advance, a capability corresponding to the configuration information. During specific execution, the terminal device may have, by directly invoking a corresponding capability, the capability corresponding to the configuration information, or the like. In yet another possible implementation, the terminal device may select corresponding power configuration information based on the capability. Regardless of the obtaining manners, before performing the steps of the method shown in FIG. 5, the terminal device may already obtain the time information in the random access response window and a transmit power that may be correspondingly used for each out-of-window sending moment and/or each in-window sending moment.

For ease of understanding by a reader, the time configuration information and the power configuration information are separately described in detail below.

1. Time Configuration Information.

As described above, the time configuration information is information used to indicate a time at which the second random access preamble is sent in the random access response window. The following describes several possible examples of the time configuration information.

(1) The time configuration information is used to indicate each sending moment at which the second random access preamble is sent. That is, the time configuration information may be used to indicate each in-window sending moment. FIG. 4 is still used as an example. The network device may notify the terminal device of specific time points of the in-window sending moments t1.1, t2.1, t2.2, t3.1, t3.2, and t3.3. After obtaining the information notified by the network device, the terminal device may directly determine each in-window sending moment.

(2) The time configuration information is used to indicate a sending time period for sending the second random access preamble in the first time period. For example, the first time period is 100 milliseconds (ms), and the sending time period indicated by the time configuration information is 25 ms. In this case, the terminal device may send the second random access preamble once at an interval of 25 ms. For example, timing starts from a start moment of the first time period, the second random access preamble is sent once at an interval of 25 ms, or timing may start from another moment. Through transmission of the sending time period, the terminal device may flexibly configure each in-window sending moment based on the sending time period.

(3) The time configuration information is used to indicate an offset of a sending moment at which the second random access preamble is sent in the first time period. The offset may be used to indicate a time interval between two adjacent in-window sending moments, and the offset may be a fixed value or may be a variable value. For example, according to an indication of the offset, a time interval between two adjacent in-window sending moments in the first time period is 18 ms. In this case, the offset is a fixed value. For another example, according to the indication of the offset, a time interval between two adjacent in-window sending moments in the first time period gradually increases. For example, a time interval between a second in-window sending moment and a first in-window sending moment is 10 ms, a time interval between a third in-window sending moment and the second in-window sending moment is 13 ms, a time interval between a fourth in-window sending moment and the third in-window sending moment is 16 ms, and so on. Alternatively, the time interval may change in another trend, for example, gradually decreases. In addition, the offset may gradually increase or decrease linearly, irregularly, exponentially, or the like. This is not limited in this embodiment of this application.

(4) The time configuration information is used to indicate a total quantity of sending times of sending the second random access preamble in the first time period. For example, the total quantity of sending times indicated by the time configuration information is four. Assuming that the first time period is 100 ms, the terminal device may flexibly configure four in-window sending moments in the 100 ms. A specific configuration manner may be, for example, uniform configuration, or may be non-uniform configuration, or another configuration manner, for example, gradually increasing the time interval, may be used. This is not limited in this embodiment of this application.

(5) The time configuration information is used to indicate a total quantity of sending times of sending the second random access preamble in the first time period and the first sending moment. Compared with the manner of indicating only the total quantity of sending times, the first sending moment is further specified in this implementation. In this way, the terminal device may flexibly and dynamically configure each in-window sending moment starting from the specified first sending moment, and therefore is more autonomous.

(6) The time configuration information is used to indicate a total quantity of sending times of sending the second random access preamble in the first time period and the last sending moment. Similar to the manner (5), the terminal device may flexibly and dynamically configure a remaining in-window sending moment ending with the specified last sending moment, and therefore is more autonomous.

(7) The time configuration information is used to indicate a total quantity of sending times of sending the second random access preamble in the first time period, the first sending moment, and the last sending moment. In this manner, it is equivalent to delimiting a start point and an end point, and the terminal device may configure remaining in-window sending moments between the delimited start point and the delimited end point. Certainly, this manner is applicable to a case in which at least two in-window sending moments are configured in the first time period. That is, the second random access preamble may be sent at least twice in the first time period by using a configuration in this manner.

The foregoing lists some possible configuration manners of an in-window sending moment. However, the foregoing listed manners are only examples and constitute no limitation. In a specific implementation process, the in-window sending moment may also be configured in another manner. This is not limited in this embodiment of this application.

Regardless of a manner of configuring the in-window sending moment in the first time period, at least one of the following time configuration principles may be followed in a configuration process.

A. After the configuration, duration of an interval between a moment at which the second random access preamble can be sent for the first time in the first time period and a start moment of the first time period needs to be less than or equal to first predetermined duration, where the first predetermined duration should not be excessively long. For example, when the first time period is 100 ms, the first predetermined duration is 20 ms. In this way, the second random access preamble can be retransmitted as soon as possible in the first time period, and a retransmission time of the random access preamble can be advanced as much as possible, thereby reducing a delay in random access preamble retransmission.

B. After the configuration, duration of an interval between a moment at which the second random access preamble can be sent for the first time in the first time period and a start moment of the first time period needs to be greater than or equal to second predetermined duration, where the second predetermined duration should not be excessively short. For example, when the first time period is 100 ms, the second predetermined duration is 10 ms or 15 ms. In this way, an initial time period in the first time period may be reserved to receive a random access response returned by the network device for a previously sent random access preamble, so that a probability of successfully receiving the random access response can be increased, and resource waste resulting from invalid sending of the random access response caused by excessively fast retransmission of the second random access preamble can be avoided, thereby improving timeliness of receiving the random access response and saving a communication resource.

C. After the configuration, duration of an interval between a moment at which the second random access preamble can be sent for the last time in the first time period and an end moment of the first time period needs to be greater than or equal to third predetermined duration, where the third predetermined duration should not be excessively short. For example, when the first time period is 100 ms, the third predetermined duration is 15 ms or 10 ms. In this way, after the second random access preamble is sent for the last time in the first time period, a specific time period in the first time period may be reserved to receive a random access response that may be returned by the network device, to increase opportunities and a probability of successfully receiving the random access response in the first time period, and improve random access efficiency.

2. Power Configuration Information.

As described above, the power configuration information is information used to indicate power ramping, and may indicate a change trend of a plurality of transmit powers used to send the random access preamble. Power ramping may include power ramping performed out of the first time period (that is, power ramping performed out of the random access response window), and may also include power ramping performed in the first time period (that is, power ramping performed in the random access response window), and may further include an association relationship between power ramping performed out of the first time period and power ramping performed in the first time period (that is, an association relationship between power ramping performed out of the random access response window and power ramping performed in the random access response window).

It should be first noted that the first time period is a general reference to a plurality of random access response windows in this embodiment of this application. To be specific, the first time period may be any one of the plurality of random access response windows. For example, in FIG. 4, the first time period may be any one of the RAR window 1, the RAR window 2, and the RAR window 3. In other words, the power ramping performed out of the first time period described in this embodiment of this application may be overall power ramping of all out-of-window sending moments in all random access response windows, and the power ramping performed in the first time period may be overall power ramping of all in-window sending moments in any random access response window. In addition, power ramping trends in different random access response windows may be the same, or power ramping trends in different random access response windows may be different.

In an implementation, a matching/correlation/association/relationship between a power ramping trend (or a power ramping value) in the random access response window and a quantity of transmission times of the second random access preamble or duration in the random access response window may be configured. The matching/correlation/association/relationship may be a specific value, or may be a function using the quantity of transmission times or the duration as a variable.

In an implementation, the power configuration information may include at least one of a first parameter and a second parameter. The first parameter may be used to represent the power ramping performed out of the first time period, and the second parameter may be used to represent the power ramping performed in the first time period. For example, the first parameter is represented by $\Delta 1$, and the second parameter is represented by $\Delta 2$. In other words, two power ramping parameters may be configured, for example, are configured by the network device. One power ramping parameter is used for the power ramping performed out of the random access response window, and the other power ramping parameter is used for the power ramping performed in the random access response window. Further, the first parameter may be used to indicate the power ramping performed out of the random access response window, and the second parameter may be used to indicate the power ramping performed in each random access response window. In addition, the power ramping indicated by the first parameter and the second parameter may include a power increase trend or a specific power increase value (that is, a power ramping value). To be specific, different parameters may be used to represent the power ramping performed out of the random access response window and the power ramping performed in the random access response window, and reference values of the power ramping performed out of the random access response window and the power ramping performed in the random access response window are different.

In some possible implementations, for example, the first parameter may be a predetermined value (for example, a first predetermined value), or may increase linearly, or a difference between an increase magnitude of the first parameter and an increase magnitude of the second parameter is a second predetermined value. For example, the second parameter may also be a predetermined value, or may increase linearly, or may increase exponentially.

Further, the second parameter in the random access response window may further include a third parameter and a fourth parameter. The third parameter is used to represent power ramping of a front part of the random access response window, and the fourth parameter is used to represent power ramping of a rear part of the random access response window, and the third parameter and the fourth parameter may indicate different power ramping trends or different power ramping values. In other words, while different power ramping parameters are separately configured for the power ramping performed out of the random access response window and the power ramping performed in the random access response window, different power ramping functions may be further separately configured in the random access response window to obtain different corresponding power ramping values, or different power ramping values may be further directly applied in the random access response window.

In another implementation, the power configuration information may include a fifth parameter, and the fifth parameter may be used to represent the power ramping performed out of the first time period and the power ramping performed in the first time period. For example, the fifth parameter is represented by $\Delta 0$. In other words, a same power ramping parameter may be configured for the power ramping performed out of the random access response window and the power ramping performed in the random access response window, and the same power ramping parameter is used to represent both the power ramping performed out of the random access response window and the power ramping performed in the random access response window. In other words, a same reference value is used for the power ramping performed out of the random access response window and the power ramping performed in the random access response window. In addition, in this embodiment, the power configuration information may further include a mapping relationship of the power ramping performed out of the first time period based on the fifth parameter and a mapping relationship of the power ramping performed in the first time period based on the fifth parameter. The mapping relationship of the power ramping performed out of the first time period may be different from the mapping relationship of the power ramping performed in the first time period. In addition, the mapping relationship herein may also be understood as a function relationship, a matching relationship, or the like.

For ease of understanding, the following separately describes the foregoing several cases that may be indicated by the power configuration information.

(1) The power configuration information is used to indicate the power ramping performed out of the first time period.

As described above, the first parameter $\Delta 1$ may be used to indicate the power ramping performed out of the first time period. In an implementation, $\Delta 1$ may be a fixed value, for example, a first predetermined value, and the first predetermined value is, for example, 3 dBm. FIG. 4 is still used as an example, that is, P_2−P_1=P_3−P_2=P_4−P_3=3 decibel-milliwatts (dBm). Out of the random access response window, a transmit power for sending the random access preamble for a next time is greater than a previous transmit power by 3 dBm. Certainly, 3 dBm herein is only an example for description. In practice, another power ramping value may be set based on a specific application scenario.

As described above, the first parameter $\Delta 1$ may be used to indicate the power ramping performed out of the first time period. In another implementation, $\Delta 1$ may be a variable value. For example, $\Delta 1$ may increase linearly as an $n^{th}$ time of sending the random access preamble out of the random access response window increases. To be specific, $\Delta 1$ is a function that uses the $n^{th}$ time of sending the random access preamble out of the random access response window as a variable, for example, a linear function $\Delta 1=k1*n/N$. k1 is a constant, n indicates a current $n^{th}$ time of sending the random access preamble out of the random access response window, and N is a total quantity of times the random access preamble can be sent out of the random access response window. As can be seen, $\Delta 1$ increases linearly as n increases in this case. Compared with the implementation in which $\Delta 1$ is a fixed value, a transmit power for repeatedly sending the random access preamble may increase linearly as the $n^{th}$ time of sending increases. In this way, the second random access preamble may be sent at a later moment by using a transmit power that increases more substantially, and possibility that the random access preamble arrives the network device can be increased as much as possible by using a transmit power that increases more substantially, thereby increasing a probability of successfully receiving the random access response, and improving random access efficiency.

(2) The power configuration information is used to indicate the power ramping performed in the first time period.

Figure 6:
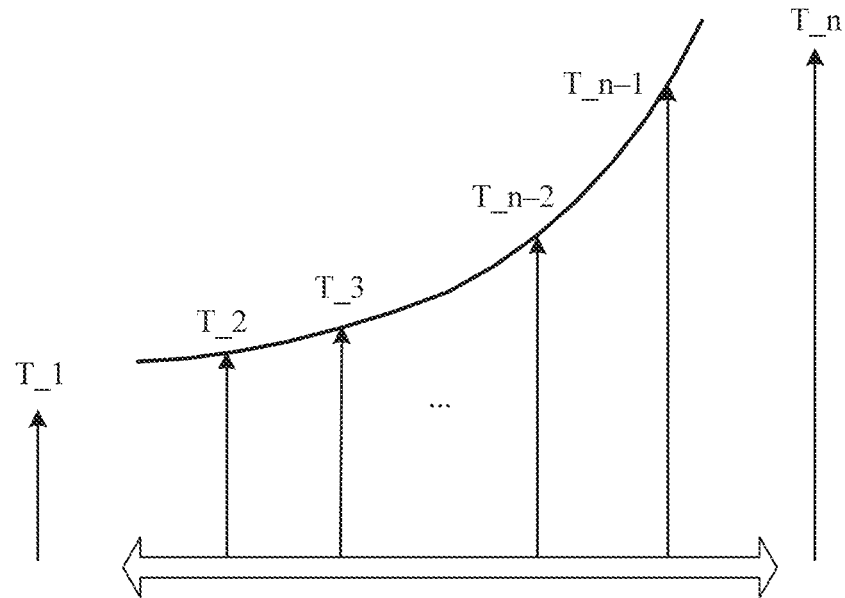
FIG. 6 is a schematic diagram of a power configuration according to an embodiment of this application.

As described above, the second parameter $\Delta 2$ may be used to indicate the power ramping performed in the first time period. For ease of understanding, in this embodiment of this application, one random access response window is used to describe a power ramping status in one first time period, and power ramping performed in another random access response window may be understood in a same implementation. For example, referring to FIG. 6, a two-way arrow in FIG. 6 represents one random access response window (that is, one first time period), and the second random access preamble may be transmitted in the random access response window for a total of n−2 times from T_2 to T_n−1. The first random access preamble is sent at T_1 before the random access response window, and the first random access preamble may be sent again at T_n after the random access response window.

In a specific implementation process, the second parameter 42 may indicate power ramping performed in different trends. The following uses an example for description.

A. $\Delta 2$ is a fixed value, for example, a second predetermined value, and the second predetermined value is, for example, 2 dBm. FIG. 6 is used as an example, that is, T_2−T_2=T_n−1−T_n−2=2 dBm. To be specific, in the random access response window, a transmit power for sending the random access preamble for each next time is greater than a previous transmit power by 2 dBm. Certainly, 2 dBm herein is only an example for description. In practice, another ramping value may be set based on a specific application scenario.

B. $\Delta 2$ is a variable value, for example, may increase linearly as an $i^{th}$ time of sending the random access preamble in the random access response window increases. To be specific, $\Delta 2$ is a function that uses the $i^{th}$ time of sending the random access preamble in the random access response window as a variable, for example, a linear function $\Delta 2=k2*i/I$. k2 is a constant, i indicates a current $i^{th}$ time of sending the random access preamble in the random access response window, and I is a total quantity of times the random access preamble can be sent in the random access response window. As can be seen, $\Delta 2$ increases linearly as i increases in this case. Compared with the implementation in which $\Delta 2$ is a fixed value, a transmit power for sending the random access preamble again may increase linearly as the $i^{th}$ time of sending increases. In this way, the random access preamble may be sent again at a moment closer to a window tail of the random access response window by using a transmit power that increases more substantially. Possibility that the random access preamble arrives at the network device can be increased as much as possible by using a transmit power that increases more substantially, thereby increasing a probability of successfully receiving the random access response, and improving random access efficiency. The foregoing uses an example in which the $i^{th}$ time of sending the random access preamble in the random access response window is a variable, to describe that Δ2 increases linearly. In a specific implementation process, duration in the random access response window may be alternatively used as a variable parameter of a linear change. An implementation principle is similar to that of using the $i^{th}$ time of sending in the random access response window as a variable. Descriptions are not repeated herein again.

Further, based on a linear change, a transmit power that is capable to send the random access preamble for the last time in the random access response window may be first determined. For example, the transmit power that is capable to send the random access preamble for the last time in the random access response window is referred to as a last transmit power. In this case, the last transmit power may be determined based on a reference transmit power for sending the first random access preamble for the first time after the random access response window. For example, the last transmit power is equal to the reference transmit power, or the last transmit power is slightly less than the reference transmit power (for example, by 4 dBm or 2 dBm). After the last transmit power is obtained, another transmit power in the random access response window may be proportional to the last transmit power. For example, a specific value of each transmit power is determined based on that a proportion is higher as the $i^{th}$ time of sending increases. In other words, a ramping value of other transmission in the random access response window is proportional to the last transmit power in the random access response window. In addition, a proportion of a transmit power closer to a window head of the random access response window is lower, and a proportion of a transmit power closer to a window tail of the random access response window is higher.

C. Δ2 is a variable value, for example, may increase exponentially as an $i^{th}$ time of sending the random access preamble in the random access response window increases. To be specific, Δ2 is an exponential function that uses the $i^{th}$ time of sending the random access preamble in the random access response window as a variable, for example, $Δ2=2i*offset$. offset is a constant coefficient, and i indicates a current $i^{th}$ time of sending the random access preamble in the random access response window. As can be seen, Δ2 increases exponentially as i increases in this case. The exponential increase has an increase trend of increasing slowly in an early period and increasing steeply in a later period. In other words, the trend of the exponential increase is that Δ2 closer to the window tail of the random access response window increases more substantially, and an increase magnitude in a later period is much greater than an increase magnitude in an early period. As shown in FIG. 6, a value of T_n−1−T_n−2 is much greater than a value of T_3−T_2, a value of T_3−T_2 may indicate Δ2 in an early period, and T_n−1−T_n−2 may indicate Δ2 in a later period. As can be seen, Δ2 in the later period is much greater than Δ2 in the early period.

As described above, reception of the random access response may fail in the random access response window because the network device does not detect the random access preamble sent by the terminal device, or because the network device cannot return the random access response due to temporarily unsuccessful LBT. In an early period of the random access response window, because there is still a period of time before the random access response window ends, if the random access response is not successfully received, it may be considered that this is mainly because the network device cannot return the random access response due to temporarily unsuccessful LBT. Therefore, the random access preamble may be sent repeatedly in this period of time by using relatively gentle power ramping. In a later period of the random access response window, if the random access response is still not successfully received, it may be considered that this is mainly because the network device does not return the random access response because the network device does not successfully detect the random access preamble. Therefore, to eliminate as much as possible possibility that the network device does not return the random access response because the network device does not detect the random access preamble, Δ2 that increases steeply (that is, relatively substantially) may be used to perform power ramping in the later period of the random access response window. In this way, the random access preamble may be sent again by using a relatively high transmit power, to increase as much as possible a probability of successfully detecting the random access preamble by the network device, thereby increasing possibility of successfully receiving the random access response, and improving random access efficiency.

D. Based on the analysis in C, relatively gentle power ramping may be performed in the front part of the random access response window, and relatively steep or abrupt power ramping may be performed in the rear part of the random access response window. In a specific implementation process, how to delimit the front part and the rear part of the random access response window? This embodiment of this application provides a more accurate delimitation manner. Further, delimitation is performed by using a value relationship between a value of a sixth parameter in the random access response window and a threshold (for example, referred to as a first threshold). For example, when the value of the sixth parameter is less than or equal to the first threshold, it may be considered that it indicates the front part of the random access response window, or when the value of the sixth parameter is greater than the first threshold, it may be considered that it indicates the rear part of the random access response window. The sixth parameter is, for example, duration (duration) in the random access response window, and the duration is a time length from a start location of the random response receiving window to a time at which a preamble needs to be sent. Assuming that a window length of the random access response window is 100 ms, the first threshold may be set to 70 ms (or 60 ms). To be specific, if the duration does not reach 70 ms, relatively gentle power ramping may be performed. If the duration exceeds 70 ms, because the duration is closer to the window tail of the random access response window, a higher transmit power is capable to send the random access preamble again. Therefore, after 70 ms, the power ramping may be performed by using a more abrupt ramping parameter that increases more substantially. For another example, the sixth parameter may alternatively be a quantity of sending times of sending the second random access preamble in the random access response window. The quantity of sending times may also be referred to as a quantity of transmissions. For example, a total quantity of sending times configured for the random access response window is five, and the first threshold may be set to three. When the quantity of sending times reaches three, it indicates that there are fewer opportunities for sending the random access preamble again in the random access response window. Therefore, to increase a probability that the network device successfully detects the random access preamble, power ramping that increases relatively substantially may be performed from the fourth time, to increase as much as possible a probability of successfully receiving the random access response in the random access response window.

In this embodiment of this application, in a manner of dividing the random access response window by using the first threshold to perform power ramping of different trends, the third parameter and the fourth parameter described above may be separately used to represent power ramping before the first threshold and power ramping after the first threshold, that is, the second parameter used to represent the power ramping performed in the random access response window may further include the third parameter and the fourth parameter. When the value of the sixth parameter in the random access response window is less than or equal to the first threshold, the power ramping is performed based on the third parameter, or when the value of the sixth parameter in the random access response window is greater than the first threshold, the power ramping is performed based on the fourth parameter. Different parameters are used to indicate power ramping of different trends, so that power ramping of different degrees before and after the first threshold can be indicated more clearly, thereby improving power ramping accuracy.

Based on the foregoing description of performing power ramping performed in a relatively gentle increase trend before the first threshold, and performing power ramping performed in a relatively abrupt increase trend after the first threshold, an embodiment of this application provides the following possible implementations:

Manner 1: The third parameter is less than the fourth parameter. Further, a power ramping value indicated by the third parameter is less than a power ramping value indicated by the fourth parameter. In addition, an offset between the third parameter and the fourth parameter may be set to be relatively large, to highlight an obvious abrupt change of power ramping trends before and after the first threshold by using the relatively large offset.

Manner 2: The third parameter is a constant, and the constant may be 0. The fourth parameter increases linearly, and a linear increase magnitude of the fourth parameter is greater than the constant corresponding to the third parameter, so that the power ramping after the first threshold is greater than the power ramping before the first threshold.

Manner 3: The third parameter increases linearly, the fourth parameter increases linearly, and a linear increase magnitude of the fourth parameter is greater than a linear increase magnitude of the third parameter, so that the power ramping after the first threshold is greater than the power ramping before the first threshold.

Figure 7:
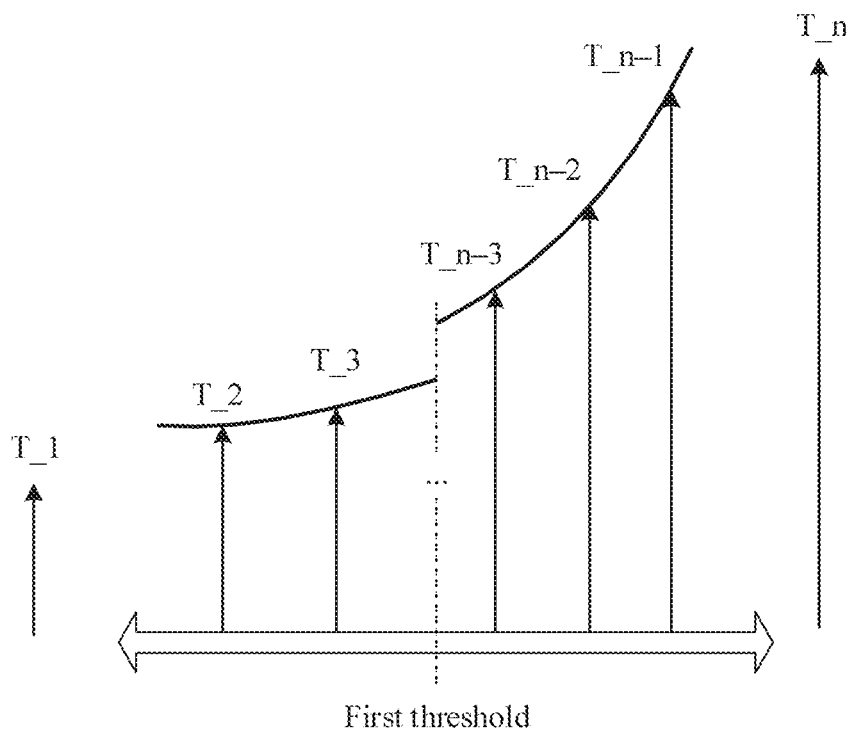
FIG. 7 is another schematic diagram of a power configuration according to an embodiment of this application.

Manner 4: The third parameter is a constant or increases linearly, and the fourth parameter increases exponentially. In this way, a power ramping trend after the first threshold may be an abrupt increase. For example, referring to FIG. 7, in a random access response window, power ramping values T_2 and T_3 before the first threshold are not greatly different, power ramping values T_n−3, T_n−2, and T_n−1 after the first threshold are all much greater than T_2 and T_3, and T_n−3, T_n−2, and T_n−1 increase abruptly.

Manner 5: The third parameter is 0, the fourth parameter is a fixed value, and the fixed value may be set to be relatively large, to highlight a relatively large power ramping magnitude after the first threshold.

Manner 6: The third parameter is 0, and the fourth parameter is equal to the first parameter. In other words, power ramping after the first threshold in the random access response window may be performed based on power ramping performed out of the random access response window.

The foregoing lists only some possible manners. In a specific implementation process, based on the foregoing description of gentle power ramping before the first threshold and relatively rapid power ramping after the first threshold, more other manners may be derived or obtained. The more other manners derived or obtained shall fall within the protection scope of the embodiments of this application.

(3) The power configuration information is used to indicate an association relationship between the power ramping performed out of the first time period and the power ramping performed in the first time period.

In an implementation, the power ramping performed out of the first time period or the power ramping performed in the first time period may be indicated by the power configuration information. For example, the power ramping performed out of the first time period is indicated by the power configuration information. For example, $\Delta 1$ is directly indicated, and $\Delta 1$ indicates the power ramping performed out of the first time period. In addition, an association relationship between the power ramping performed out of the first time period and the power ramping performed in the first time period may be further indicated. For example, the association relationship is a difference relationship, that is, $\Delta 2 = \Delta 1 + a$, where a is a constant. As can be seen from the association relationship, an offset between a power ramping value in the first time period and a power ramping value out of the first time period is a constant value. In this case, as long as $\Delta 1$ out of the first time period is known, $\Delta 2$ in the first time period may be calculated based on the association relationship and a. In addition, the association relationship between the power ramping performed out of the first time period and the power ramping performed in the first time period may also be represented by a preset function. The preset function is the same as the foregoing example, and may be a linear relationship, an exponential relationship, or another specific relationship.

Figure 8:
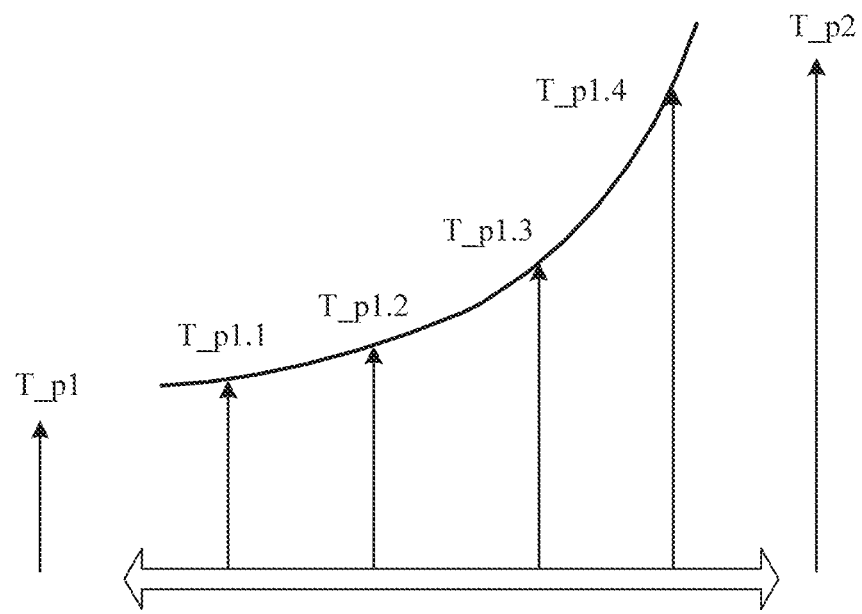
FIG. 8 is another schematic diagram of a power configuration according to an embodiment of this application.

In another implementation, for example, a fifth parameter is used to indicate a same reference power ramping value used for the power ramping performed in the random access response window and the power ramping performed out of the random access response window. In other words, the fifth parameter is used to indicate $\Delta 0$. For transmission performed out of the random access response window, a transmit power may ramp based on $\Delta 0$. However, in the random access response window, two consecutive transmit powers out of the random access response window are used as a reference, and an exponential increase is performed within a range of the two transmit powers. Referring to FIG. 8, a difference between two transmit powers before and after the random access response window is $\Delta 0$. In other words, $T\_p2 = T\_p1 + 0$. In the random access response window, an initial transmit power (that is, $T\_p1.1$) increases relatively slowly and approaches $T\_p1$, and the transmit power increases exponentially along with time in the window, that is, approaches $T\_p2$ relatively quickly. For example, the transmit power in the random access response window may be determined based on the following formula $T\_p1.n = T\_p1 + 2n \cdot \Delta 0 / 2N$. $T\_p1.n$ represents a transmit power of each time in the random access response window, N is a possible total quantity of transmissions in the random access response window, and n indicates an nth time of transmission in the random access response window. In a specific implementation process, other possible implementations may be obtained with reference to the foregoing example, and examples are not described herein again one by one.

In this embodiment of this application, one reference value, that is, the fifth parameter is used to represent the power ramping performed in the random access response window and the power ramping performed out of the random access response window, and the power ramping performed in the random access response window and the power ramping performed out of the random access response window may be simplified by using a same reference criterion. In addition, because different mapping relationships are used for the power ramping performed out of the random access response window and the power ramping performed in the random access response window, power ramping of different trends may be performed out of the random access response window and in the random access response window, to separately meet a requirement on the power ramping performed out of the random access response window and a requirement on the power ramping performed in the random access response window.

In addition, in this embodiment of this application, the time configuration information, the power configuration information, each threshold, and each parameter (for example, the first parameter, the second parameter, the third parameter, the fourth parameter, the fifth parameter, and the sixth parameter) may be configured by the network device, that is, may be indicated by the network device by using higher layer signaling, for example, indicated by using at least one of Radio Resource Control (RRC) signaling, media access control (MAC) layer signaling, or physical layer signaling, or may be preconfigured in the terminal device, or some of the time configuration information, the power configuration information, each threshold, and each parameter may be configured by the network device temporarily and the remaining is preconfigured in the terminal device. A specific manner of obtaining each parameter is not limited in this embodiment of this application.

Figure 9:
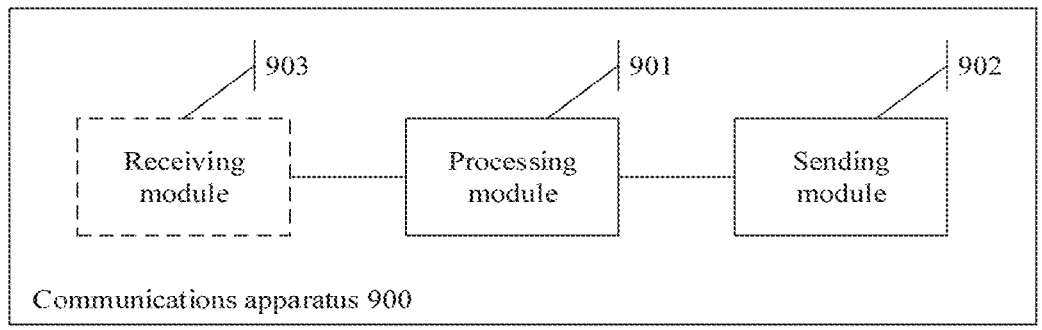
FIG. 9 is a structural block diagram of a communications apparatus according to an embodiment of this application.

Based on a same idea, referring to FIG. 9, an embodiment of this application provides a communications apparatus 900. The communications apparatus 900 may be a terminal device, and can implement functions of the terminal device in the random access preamble sending method and the random access preamble receiving method provided in the embodiments of this application. Alternatively, the communications apparatus 900 may be an apparatus that can support the terminal device in implementing the functions of the terminal device in the random access preamble sending method and the random access preamble receiving method provided in the embodiments of this application. The communications apparatus 900 may be a hardware structure, a software module, or a hardware structure plus a software module. The communications apparatus 900 may be implemented by a chip system. In this embodiment of this application, the chip system may include a chip, or may include a chip and another discrete device. As shown in FIG. 9, the communications apparatus 900 may include a processing module 901, a sending module 902, and a receiving module 903. The receiving module 903 may not be a mandatory module and therefore is represented by a dashed line in FIG. 9. The sending module 902 and the receiving module 903 are used by the communications apparatus 900 to communicate with another module, and may be circuits, devices, interfaces, buses, software modules, transceivers, or any other apparatuses that can implement communication.

The processing module 901 may be configured to perform S54 in the embodiment shown in FIG. 5, and/or configured to support another process of the technology described in this specification. The sending module 902 may be configured to perform S51 and S55 in the embodiment shown in FIG. 5, and/or configured to support another process of the technology described in this specification. The receiving module 903 may be configured to perform S53 and S57 in the embodiment shown in FIG. 5, and/or configured to support another process of the technology described in this specification. In a specific implementation process, the sending module 902 and the receiving module 903 may perform a corresponding communication function under control of the processing module 901.

Figure 10:
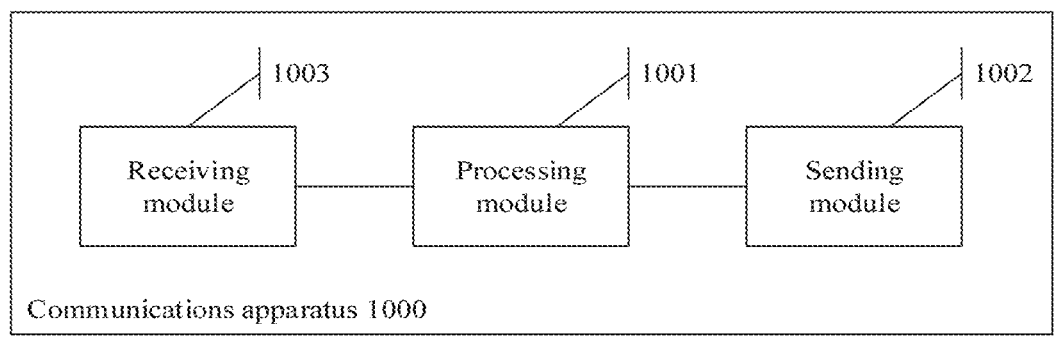
FIG. 10 is another structural block diagram of a communications apparatus according to an embodiment of this application.

Based on a same idea, referring to FIG. 10, an embodiment of this application provides a communications apparatus 1000. The communications apparatus 1000 may be a network device, and can implement functions of the network device in the random access preamble sending method and the random access preamble receiving method provided in the embodiments of this application. Alternatively, the communications apparatus 1000 may be an apparatus that can support the network device in implementing functions of the network device in the random access preamble sending method and the random access preamble receiving method provided in the embodiments of this application. The communications apparatus 1000 may be a hardware structure, a software module, or a hardware structure plus a software module. The communications apparatus 1000 may be implemented by a chip system. In this embodiment of this application, the chip system may include a chip, or may include a chip and another discrete device. As shown in FIG. 10, the communications apparatus 1000 may include a processing module 1001, a sending module 1002, and a receiving module 1003. The sending module 1002 and the receiving module 1003 are used by the communications apparatus 1000 to communicate with another module, and may be circuits, devices, interfaces, buses, software modules, transceivers, or any other apparatuses that can implement communication. In a specific implementation process, the sending module 1002 and the receiving module 1003 may perform corresponding communication functions under control of the processing module 1001.

All related content of the steps in the foregoing method embodiments may be referenced to function descriptions of corresponding functional modules. Details are not described herein again.

Figure 11:
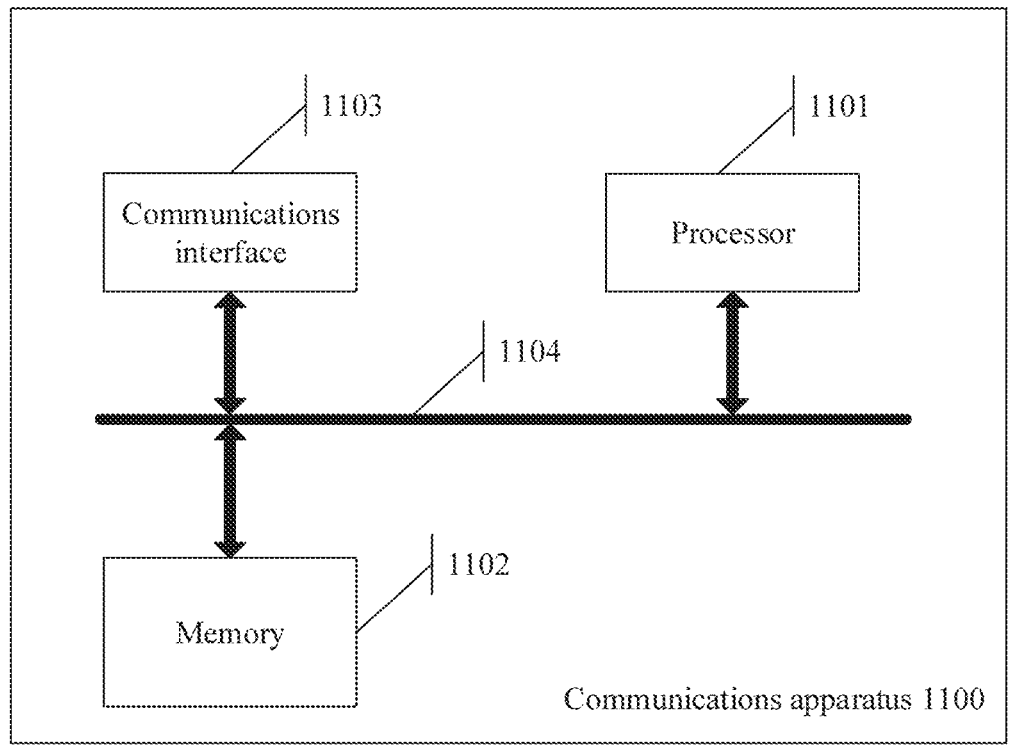
FIG. 11 is a schematic structural diagram of a communications apparatus according to an embodiment of this application.

Based on a same idea, referring to FIG. 11, an embodiment of this application provides a communications apparatus 1100. FIG. 11 is a schematic structural diagram of the communications apparatus 1100 according to this embodiment of this application. The communications apparatus 1100 may be a terminal device, and can implement functions of the terminal device in the random access preamble sending method and the random access preamble receiving method provided in the embodiments of this application. Alternatively, the communications apparatus 1100 may be an apparatus that can support the terminal device in implementing the functions of the terminal device in the random access preamble sending method and the random access preamble receiving method provided in the embodiments of this application. The communications apparatus 1100 may be a chip system. In this embodiment of this application, the chip system may include a chip, or may include a chip and another discrete device.

The communications apparatus 1100 includes at least one processor 1101 configured to implement or support the apparatus in implementing the functions of the terminal device in the random access preamble sending method and the random access preamble receiving method provided in the embodiments of this application.

The communications apparatus 1100 may further include at least one memory 1102 configured to store a program instruction and/or data. The memory 1102 is coupled to the processor 1101. The coupling in this embodiment of this application is an indirect coupling or a communication connection between apparatuses, units, or modules, and may be in an electrical, mechanical, or another form, and is used for information exchange between apparatuses, units, or modules. The processor 1101 may cooperate with the memory 1102 in an operation. The processor 1101 may execute the program instruction stored in the memory 1102. At least one of the at least one memory may be included in the processor.

The communications apparatus 1100 may further include a communications interface 1103 configured to communicate with another device by using a transmission medium, so that an apparatus used in the apparatus 1100 may communicate with the other device. The processor 1101 may send and receive data by using the communications interface 1103. For example, the communications interface 1103 may correspond to the sending module 902 and the receiving module 903 in FIG. 9. The communications receiving 1103 may be a transceiver.

A specific connection medium among the communications interface 1103, the processor 1101, and the memory 1102 is not limited in this embodiment of this application. In this embodiment of this application, the memory 1102, the processor 1101, and the communications interface 1103 are connected by using a bus 1104 in FIG. 11. The bus is represented by a thick line in FIG. 11. A manner of connection between other components is only an example for description and is not limited thereto. The bus may be classified into an address bus, a data bus, a control bus, and the like. For ease of representation, only one thick line is used to represent the bus in FIG. 11, but this does not mean that there is only one bus or only one type of bus.

Figure 12:
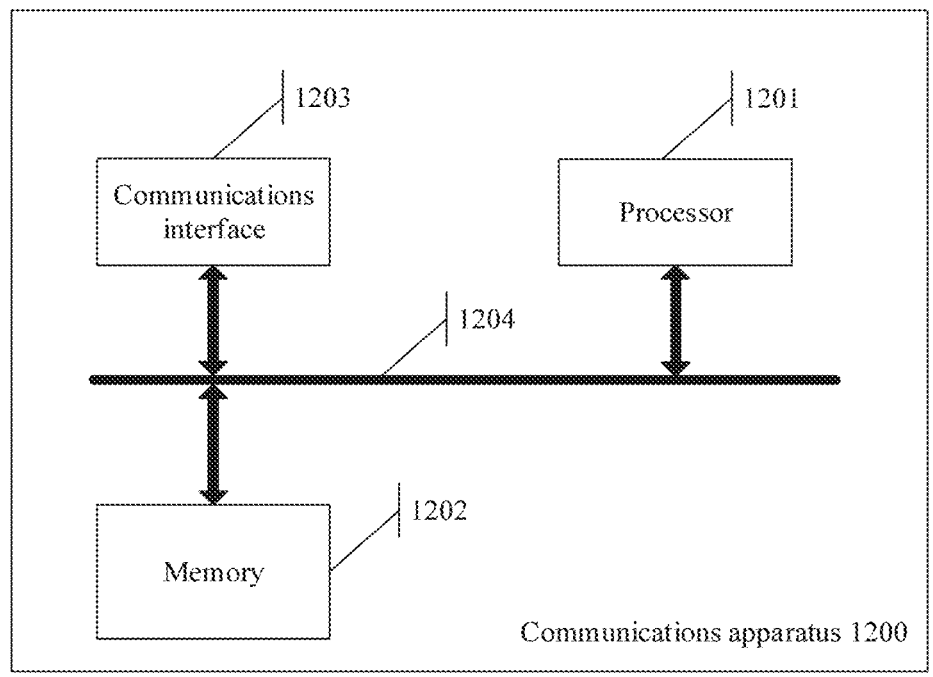
FIG. 12 is another schematic structural diagram of a communications apparatus according to an embodiment of this application.

Based on a same idea, referring to FIG. 12, an embodiment of this application provides a communications apparatus 1200. FIG. 12 is a schematic structural diagram of the communications apparatus 1200 according to this embodiment of this application. The communications apparatus 1200 may be a network device, and can implement functions of the network device in the random access preamble sending method and the random access preamble receiving method provided in the embodiments of this application. Alternatively, the communications apparatus 1200 may be an apparatus that can support the network device in implementing the functions of the network device in the random access preamble sending method and the random access preamble receiving method provided in the embodiments of this application. The communications apparatus 1200 may be a chip system. In this embodiment of this application, the chip system may include a chip, or may include a chip and another discrete device.

The communications apparatus 1200 includes at least one processor 1201 configured to implement or support the apparatus in implementing the functions of the network device in the random access preamble sending method and the random access preamble receiving method provided in the embodiments of this application.

The communications apparatus 1200 may further include at least one memory 1202 configured to store a program instruction and/or data. The memory 1202 is coupled to the processor 1201. The coupling in this embodiment of this application is an indirect coupling or a communication connection between apparatuses, units, or modules, and may be in an electrical, mechanical, or another form, and is used for information exchange between apparatuses, units, or modules. The processor 1201 may cooperate with the memory 1202 in an operation. The processor 1201 may execute the program instruction stored in the memory 1202. At least one of the at least one memory may be included in the processor.

The communications apparatus 1200 may further include a communications interface 1203 configured to communicate with another device by using a transmission medium, so that an apparatus used in the apparatus 1200 may communicate with the other device. The processor 1201 may send and receive data by using the communications interface 1203. For example, the communications interface 1203 may correspond to the sending module 1002 and the receiving module 1003 in FIG. 10. The communications receiving 1203 may be further a transceiver.

A specific connection medium among the communications interface 1203, the processor 1201, and the memory 1202 is not limited in this embodiment of this application. In this embodiment of this application, the memory 1202, the processor 1201, and the communications interface 1203 are connected by using a bus 1204 in FIG. 12. The bus is represented by a thick line in FIG. 12. A manner of connection between other components is only an example for description and is not limited thereto. The bus may be classified into an address bus, a data bus, a control bus, and the like. For ease of representation, only one thick line is used to represent the bus in FIG. 12, but this does not mean that there is only one bus or only one type of bus.

In the embodiments of this application, the processor 1101 and the processor 1201 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module.

In the embodiments of this application, the memory 1102 and the memory 1202 may be non-volatile memories, for example, hard disk drives (HDDs) or solid-state drives (SSDs), or may be volatile memories, for example, random-access memories (RAMs). The memory is any other medium that can be configured to carry or store desired program code in a form of an instruction or a data structure and that can be accessed by a computer, but is not limited thereto. The memory in the embodiments of this application may alternatively be a circuit or any other apparatus that can implement a storage function, and is configured to store a program instruction and/or data.

An embodiment of this application further provides a storage medium. The storage medium includes a computer instruction. When the computer instruction is run on a computer, the computer is enabled to perform the random access preamble sending method and the random access preamble receiving method in the embodiments of this application.

An embodiment of this application further provides a chip system. The chip system includes a processor and may further include a memory, and is configured to implement the random access preamble sending method and the random access preamble receiving method in the embodiments of this application. The chip system may include a chip, or may include a chip and another discrete device.

An embodiment of this application further provides a communications system. The communications system includes the communications apparatus 900 in FIG. 9 and the communications apparatus 1000 in FIG. 10.

An embodiment of this application further provides another communications system. The communications system includes the communications apparatus 1100 in FIG. 11 and the communications apparatus 1200 in FIG. 12.

An embodiment of this application further provides a computer program product including an instruction. The computer program product stores the instruction. When the instruction is run on a computer, the computer is enabled to perform the random access preamble sending method and the random access preamble receiving method in the embodiments of this application.

In the embodiments of this application, the terminal device may send the random access preamble to the network device in the random access response window, so that a moment at which the random access preamble is sent again is advanced, a delay of sending the random access preamble again is reduced, and random access efficiency is improved.

The foregoing embodiments are merely used to describe the technical solutions of this application. The descriptions of the foregoing embodiments are merely intended to help understand the method of the embodiments of the present disclosure, and shall not be construed as a limitation on the embodiments of the present disclosure. Variations or replacements readily figured out by a person skilled in the art shall fall within the protection scope of the embodiments of the present disclosure.

What is claimed is:

1. A method, wherein the method comprises:
   sending, from a terminal device during a first time period, a first random access preamble to a network device, wherein the first time period is a random access response (RAR) window configured with a preset time delay to receive a random access response from the network device;
   obtaining power configuration information indicating an association relationship between a first power ramping performed in the first time period and a second power ramping performed outside of the first time period, wherein a difference between a first increase magnitude of the first power ramping and a second increase magnitude of the second power ramping is a predetermined value; and
   sending, according to the power configuration information, during the same first time period and the same preset time delay of the first time period before the first time period ends, a second random access preamble to the network device when the terminal device does not receive a random access response prior to a first sending moment within the first time period.

2. The method of claim 1, wherein the first sending moment is one of a plurality of sending moments in the first time period.

3. The method of claim 1, further comprising obtaining time configuration information indicating a time for sending the second random access preamble during the first time period.

4. The method of claim 3, wherein the time configuration information further indicates at least one of:
   a first duration of a first interval between a first moment when the second random access preamble is first sent during the first time period and a start moment of the first time period is less than or equal to a first predetermined duration;
   a second duration of a second interval between the first moment and the start moment is greater than or equal to a second predetermined duration; or
   a third duration of a third interval between a second moment when the second random access preamble is last sent during the first time period and an end moment of the first time period is greater than or equal to a third predetermined duration.

5. The method of claim 1, wherein the power configuration information comprises at least one of:
   a first parameter representing the second power ramping; or
   a second parameter representing the first power ramping.

6. The method of claim 1, wherein the power configuration information comprises:
   a third parameter indicating the second power ramping and the first power ramping;
   a first mapping relationship of the second power ramping based on the third parameter; and
   a second mapping relationship of the first power ramping based on the third parameter,
   wherein the first mapping relationship is different from the second mapping relationship.

7. The method of claim 1, wherein a first transmit power capable of sending the second random access preamble for a last time during the first time period is less than or equal to a second transmit power that sends the first random access preamble at a third moment, and wherein the third moment is when the first random access preamble is first sent after the first time period.

8. The method of claim 1 further comprising:
   receiving, from the network device, a second random access response to the second random access preamble during the first time period; and
   receiving, from the network device, at least one of time configuration information or power configuration information.

9. The method of claim 1, the method further comprises receiving, during the first time period and after sending the second random access preamble, a first random access response to the first random access preamble.

10. The method of claim 1, wherein the first random access preamble and the second random access preamble are same or different random access preambles.

11. The method of claim 1 further comprising:
    performing, before sending the first random access preamble, a listen before talk (LBT); and
    sending the first random access preamble when the LBT succeeds.

12. An apparatus comprising:
    a memory configured to store instructions; and
    at least one processor coupled to the memory, wherein the instructions cause the at least one processor to be configured to:
    send, during a first time period, a first random access preamble to a network device, wherein the first time period is a random access response (RAR) window configured with a preset time delay to receive a random access response from the network device;

obtain power configuration information indicating an association relationship between a first power ramping performed in the first time period and a second power ramping performed outside of the first time period, wherein a difference between a first increase magnitude of the first power ramping and a second increase magnitude of the second power ramping is a predetermined value; and send, according to the power configuration information, during the first time period and the same preset time delay of the first time period before the first time period ends, a second random access preamble to the network device when the apparatus does not receive a random access response prior to a first sending moment within the first time period.

13. The apparatus of claim 12, wherein the first sending moment is one of a plurality of sending moments in the first time period.

14. The apparatus of claim 12, wherein the instructions further cause the at least one processor to be configured to obtain time configuration information indicating a time for sending the second random access preamble during the first time period.

15. The apparatus of claim 14, wherein the time configuration information further indicates at least one of:
a first duration of a first interval between a first moment when the second random access preamble is first sent during the first time period and a start moment of the first time period is less than or equal to a first predetermined duration;
a second duration of a second interval between the first moment and the start moment is greater than or equal to a second predetermined duration; or
a third duration of a third interval between a second moment when the second random access preamble is last sent during the first time period and an end moment of the first time period is greater than or equal to a third predetermined duration.

16. The apparatus of claim 12, wherein the power configuration information comprises at least one of:
a first parameter representing the second power ramping; or
a second parameter representing the first power ramping.

17. The apparatus of claim 12, wherein the power configuration information further comprises:
a third parameter indicating the second power ramping and the first power ramping;
a first mapping relationship of the second power ramping based on the third parameter; and
a second mapping relationship of the first power ramping based on the third parameter,
wherein the first mapping relationship is different from the second mapping relationship.

18. The apparatus of claim 12, wherein a first transmit power capable of sending the second random access preamble for a last time during the first time period is less than or equal to a second transmit power that sends the first random access preamble at a third moment, and wherein the third moment is when the first random access preamble is first sent after the first time period.

19. The apparatus of claim 12, wherein the instructions further cause the at least one processor to be configured to, after sending the second random access preamble, sending at least one third random access preamble to the network device during the first time period when the apparatus does not receive the random access response prior to the first sending moment.

20. The apparatus of claim 19, wherein the second random access preamble and the at least one third random access preamble are same or different random access preambles.

* * * * *